(12) United States Patent
Wakayama et al.

(10) Patent No.: US 8,401,384 B2
(45) Date of Patent: Mar. 19, 2013

(54) OPTICAL ACCESS SYSTEM, OPTICAL SWITCHING UNIT AND OPTICAL LINE TERMINAL

(75) Inventors: Koji Wakayama, Kokubunji (JP); Hiroki Ikeda, Hachioji (JP); Michitaka Okuno, Kokubunji (JP); Kenichi Sakamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 814 days.

(21) Appl. No.: 12/503,884

(22) Filed: Jul. 16, 2009

(65) Prior Publication Data
US 2010/0021160 A1  Jan. 28, 2010

(30) Foreign Application Priority Data
Jul. 24, 2008  (JP) ................. 2008-190494

(51) Int. Cl.
*H04J 14/00* (2006.01)
*H04B 10/00* (2006.01)
(52) U.S. Cl. .......................... 398/45; 398/154
(58) Field of Classification Search .......... 398/58, 398/45, 51, 54, 70–72, 69, 66–68
See application file for complete search history.

(56) References Cited

U.S. PATENT DOCUMENTS

| | | | |
|---|---|---|---|
| 6,239,887 B1 * | 5/2001 | Van De Voorde et al. ...... 398/45 |
| 2006/0127087 A1 * | 6/2006 | Kasai et al. .................. 398/45 |
| 2006/0239285 A1 * | 10/2006 | Nomura et al. ............. 370/408 |
| 2007/0172236 A1 * | 7/2007 | Nomura et al. .............. 398/45 |
| 2007/0274717 A1 * | 11/2007 | Xu et al. ..................... 398/58 |
| 2008/0298799 A1 * | 12/2008 | Takihiro et al. .............. 398/2 |
| 2009/0002149 A1 * | 1/2009 | McKelvey et al. .......... 340/531 |

FOREIGN PATENT DOCUMENTS

| | | |
|---|---|---|
| JP | 2000-151524 A | 5/2000 |
| JP | 2006-246262 A | 9/2006 |
| JP | 2007-67948 A | 3/2007 |

OTHER PUBLICATIONS

Hiromi Ueda, Takumi Nomura, Kunitetsu Makino, Toshinori Tsuboi, Hiroaki Kurokawa, Members, and Hiroyukl Kasai, Fellow; New Optical Access Network Architecture Using Optical Packet Switches; IEICE Trans. Commun., vol. E89-B, No. 3 Mar. 2006.*

(Continued)

*Primary Examiner* — Kenneth N Vanderpuye
*Assistant Examiner* — Abbas H Alagheband
(74) *Attorney, Agent, or Firm* — Mattingly & Malur, PC

(57) ABSTRACT

Provided is an optical access system, including: an optical line terminal, a plurality of optical network units and an optical switching unit. The optical line terminal sends to the optical switching unit a control frame including a switching time when the optical switching unit is to make a switch from one of the optical communication paths between the optical line terminal and the plurality of optical network units to another, and an identifier of an optical communication path to which the switch is made in order to switch the optical communication paths between the optical line terminal and the plurality of optical network units. The optical switching unit switches the optical communication paths between the optical line terminal and the plurality of optical network units based on the switching time and the identifier of the optical communication path after switching which are included in the control frame.

16 Claims, 17 Drawing Sheets

OTHER PUBLICATIONS

Hiromi Ueda, Takumi Nomura, Kunitetsu Makino, Toshinori Tsuboi, Hiroaki Kurokawa, Members, and Hiroyuki Kasai, Fellow; New Optical Access Network Architecture Using Optical Packet Switches; IEICE Trans. Commun., vol. E89-B, No. 3 Mar. 2006.*

Takumi Nomura, Hiromi Ueda, Toshinori Tsuboi and Hiroyuki Kasai, NEC Communication Systems, Ltd., 8916-47, Takayama-cho, Ikoma-shi, Nara 630-0101, Japan Tokyo University of Technology, 1404-1 Katakura-cho, Hachioji-shi, Tokyo 192-0982, Japan; Design and Development of Optical Packet Switched Network-Element in GE-OSAN; COIN—ACOFT Jul. 24, 2007.*

IEEE Std 802.3TM-2005, Part 3: Carrier sense multiple access with collision detection (CSMA/CD) access method and physical layer specifications, IEEE Computer Society, Dec. 9, 2005, pp. 243-298.

Itu-T Recommendation G.984.1 (Mar. 2003), Gigabit-capable Passive Optical Networks (GPON): General characteristics, Mar. 2003.

H. Ueda et al., New Optical Access Network Architecture Using Optical Packet Switches, IEICE Trans. Commun., vol. E89-B, No. 3, Mar. 2006, pp. 724-730.

T. Nomura et al., Design of Optical Switching Module for Gigabit Ethernet Optical Switched Access Network, IEICE Trans. Commun., vol. E89-B, No. 11, Nov. 2006, pp. 3021-3031.

* cited by examiner

| MAC ADDRESS | LLID |
|---|---|
| AA BB 00 11 22 33 | LLID#1 |
| CC B4 00 3A 53 DF | LLID#2 |
| 43 21 EF AB 89 67 | LLID#3 |
| ⋮ | ⋮ |

| PORT NUMBER | LLID |
|---|---|
| 0x00 | LLID#1 |
| 0x01 | LLID#2 |
| 0x02 | LLID#3 |
| ⋮ | ⋮ |
| 0x7F | LLID#100 |

US 8,401,384 B2

OPTICAL ACCESS SYSTEM, OPTICAL SWITCHING UNIT AND OPTICAL LINE TERMINAL

CLAIM OF PRIORITY

The present application claims priority from Japanese patent application JP 2008-190494 filed on Jul. 24, 2008, the content of which is hereby incorporated by reference into this application.

BACKGROUND OF THE INVENTION

This invention relates to an optical access system, and more particularly, to a technology of controlling optical communication path switching in an optical access system that uses an optical switch to switch optical communication paths.

An optical access system with a passive optical network (PON) has become popular as a way to access the Internet at high speed. Variations of PON technology include an Ethernet passive optical network (EPON) defined in IEEE Std 802.3TM-2005 and a Gigabit-capable passive optical network (GPON) defined in ITU-T Recommendation G. 984.1.

A PON includes an optical line terminal (OLT), which terminates an optical fiber on the side of a central office of a telecommunications carrier, an optical network unit (ONU), which terminates an optical fiber on the user terminal side, and a splitter, which splits an optical fiber led out of the OLT up among a plurality of the ONUs.

Being a passive device, the splitter keeps the cost of building the network low. The splitter, however, splits a signal into as many copies as the total count of ONUs, allowing the signal to reach other ONUs in addition to the originally intended receiver of the communication. The resultant problem is that satisfactory secrecy is not always guaranteed. Further, signal branching in the splitter lowers the optical signal power and presents a problem that an increase in number of branches shortens the communicable distance.

As a solution to those problems of PONs, there has been proposed a network in which an optical switch, which is an active device, is used to split an optical fiber in place of the splitter provided in a PON (see, for example, JP 2006-246262 A, JP 2007-67948 A, IEICE TRANS. COMMUN., VOL. E89-B, NO. 3 pp. 724-730, and IEICE TRANS. COMMUN., VOL. E89-B, NO. 11 pp. 3021-3031).

SUMMARY OF THE INVENTION

With technologies described in IEICE TRANS. COMMUN., VOL. E89-B, NO. 3 pp. 724-730 and IEICE TRANS. COMMUN., VOL. E89-B, NO. 11 pp. 3021-3031, a unit that makes a switch to an output port for a desired ONU splits an optical signal sent from the OLT into a signal for the optical switch and a signal for a circuit that performs frame reading processing. In the frame reading circuit, a logical link identifier (LLID) set in the preamble part of an EPON frame is used in switching output ports of the optical switch. A delay circuit needs to be provided downstream of the optical switch in order to delay signal transmission by the amount of time required for processing in the frame reading circuit. According to IEICE TRANS. COMMUN., VOL. E89-B, NO. 11 pp. 3021-3031, when the delay circuit is built from an optical fiber, the optical fiber measures 42.4 m in length and hinders the downsizing of the output port switching unit.

A representative aspect of this invention is as follows. That is, there is provided an optical access system, including: an optical line terminal which is connected to another network; a plurality of optical network units which are each connected to a user terminal; and an optical switching unit which is implemented between the optical line terminal and the plurality of optical network units to switch optical communication paths between the optical line terminal and the plurality of optical network units. The optical line terminal sends to the optical switching unit a control frame including a switching time when the optical switching unit is to make a switch from one of the optical communication paths between the optical line terminal and the plurality of optical network units to another, and an identifier of an optical communication path to which the switch is made in order to switch the optical communication paths between the optical line terminal and the plurality of optical network units. The optical switching unit switches the optical communication paths between the optical line terminal and the plurality of optical network units based on the switching time and the identifier of the optical communication path after switching which are included in the control frame.

According to this invention, the optical line terminal (OLT) determines a switching control schedule of an optical switch and data frame transmission timing, and conveys the determined switching control schedule and transmission timing to the optical switching unit (OSW), thereby eliminating the need for delay control of an optical signal in the OSW. The OSW can thus be made small in size.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Embodiments of this invention are described below with reference to the drawings.

Figure 1:
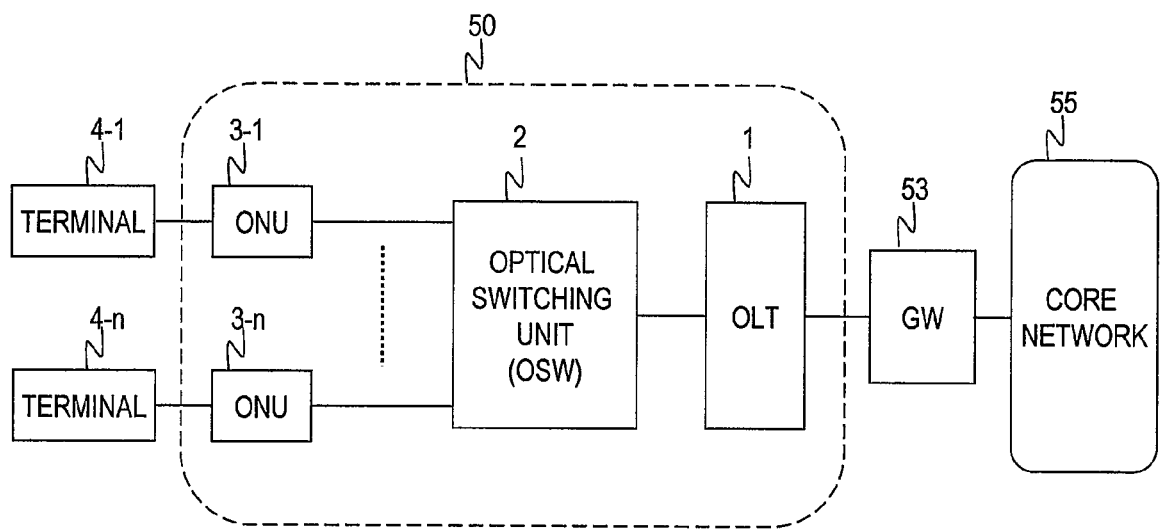
FIG. 1 is a block diagram illustrating a configuration example of a network in accordance with a first embodiment of this invention.

FIG. 1 is a block diagram illustrating a configuration example of a network according to a first embodiment of this invention.

An optical access system 50 of the first embodiment includes an optical line terminal (OLT) 1, an optical switching unit (OSW) 2, and optical network units (ONUs) 3. The optical access system 50 includes as many ONUs 3 as the count of users. The ONUs 3 are referred to as ONUs 3 when there is no need to discriminate one from another, and referred to as ONUs 3-1 to 3-n when discriminating one from another is necessary.

A plurality of user terminals 4 (4-1 to 4-n) are connected to the ONUs 3. The user terminals 4 communicate with a core network 55 via the optical access system 50 and a gateway (GW) 53.

Figure 2:
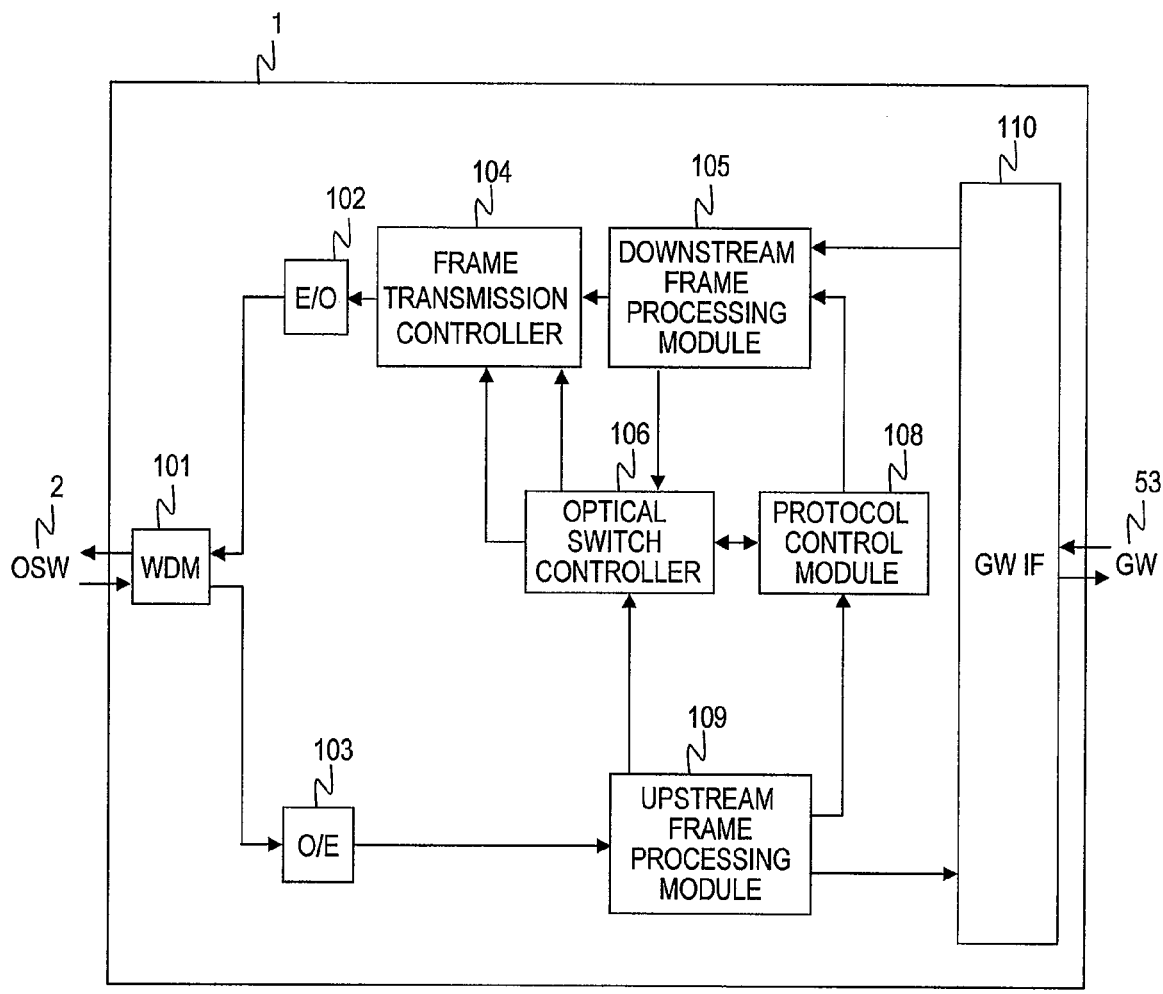
FIG. 2 is a block diagram illustrating a configuration example of an optical line terminal (OLT) in accordance with the first embodiment of this invention.

FIG. 2 is a block diagram illustrating a configuration example of the OLT 1 according to the first embodiment of this invention.

The OLT 1 includes a multiplexing/demultiplexing module (WDM) 101, an electrical-optical signal converter (E/O converter) 102, an optical-electrical signal converter (O/E converter) 103, a frame transmission control module 104, a downstream frame processing module 105, an optical switch controller 106, a protocol control module 108, an upstream frame processing module 109, and a gateway interface (GW IF) 110.

The multiplexing/demultiplexing module (WDM) 101 separates and combines an upstream optical signal (optical signal traveling from the OSW 2 to the OLT 1) and a downstream optical signal (optical signal traveling from the OLT 1 to the OSW 2) which undergo wavelength multiplexing between the OLT 1 and the OSW 2. The electrical-optical signal converter (E/O converter) 102 converts an electrical signal into an optical signal. The optical-electrical signal converter (O/E converter) 103 converts an optical signal into an electrical signal.

The frame transmission control module 104 controls the transmission of a frame sent to the OSW 2. The downstream frame processing module 105 generates a frame to be sent to the OSW 2. The optical switch controller 106 performs processing for controlling the OSW 2.

The protocol control module 108 performs protocol processing for controlling communication between the OLT 1 and the ONUs 3 (specifically, processing equivalent to Multipoint Control Protocol (MPCP), which is defined in IEEE Std 802. 3TM-2005). The upstream frame processing module 109 processes a frame received from the OSW 2. The gateway interface (GW IF) 110 is a physical line interface for the GW 53.

Next, processing executed by the OLT 1 in downstream communication, i.e., communication from the OLT 1 to the OSW 2, is described.

The GW IF 110 of the OLT 1 receives a frame from the GW 53 and sends the received frame to the downstream frame processing module 105.

Figures 15, 16A:
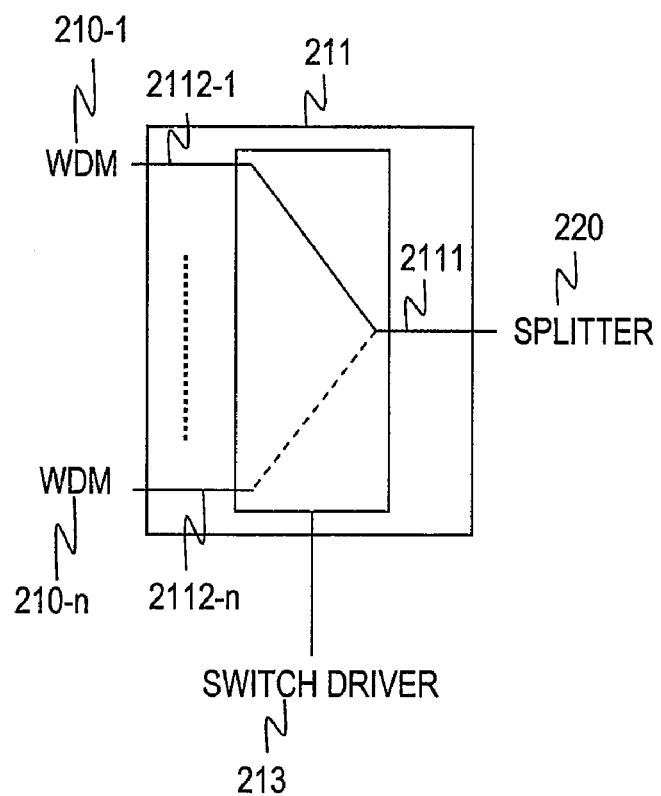
FIG. 15 is a diagram illustrating an example of a table kept in the OLT in which the association relation between a MAC address and an LLID is set in accordance with the first embodiment of this invention.
FIG. 16A is a block diagram illustrating an example of a configuration of the switch elements in accordance with the first embodiment of this invention.

The downstream frame processing module 105 keeps a table illustrated in FIG. 15. The association between a MAC address and a logical link identifier (LLID) for identifying each ONU 3 is set in this table. The downstream frame processing module 105 refers to the table of FIG. 15 and, based on a destination MAC address that is attached to the received frame, obtains an LLID to be attached to a frame that is sent to the OSW 2.

The optical switch controller 106 obtains, from the downstream frame processing module 105, information about a frame that the OLT 1 sends to the OSW 2, and obtains, from the protocol control module 108, information about time points at which the ONUs 3 send frames to the OSW 2, to thereby determine a switching schedule of an optical switch element in the OSW 2. The optical switch controller 106 also generates an optical switch control frame in order to notify the OSW 2 of the switching schedule of the optical switch element in the OSW 2.

Figure 3:
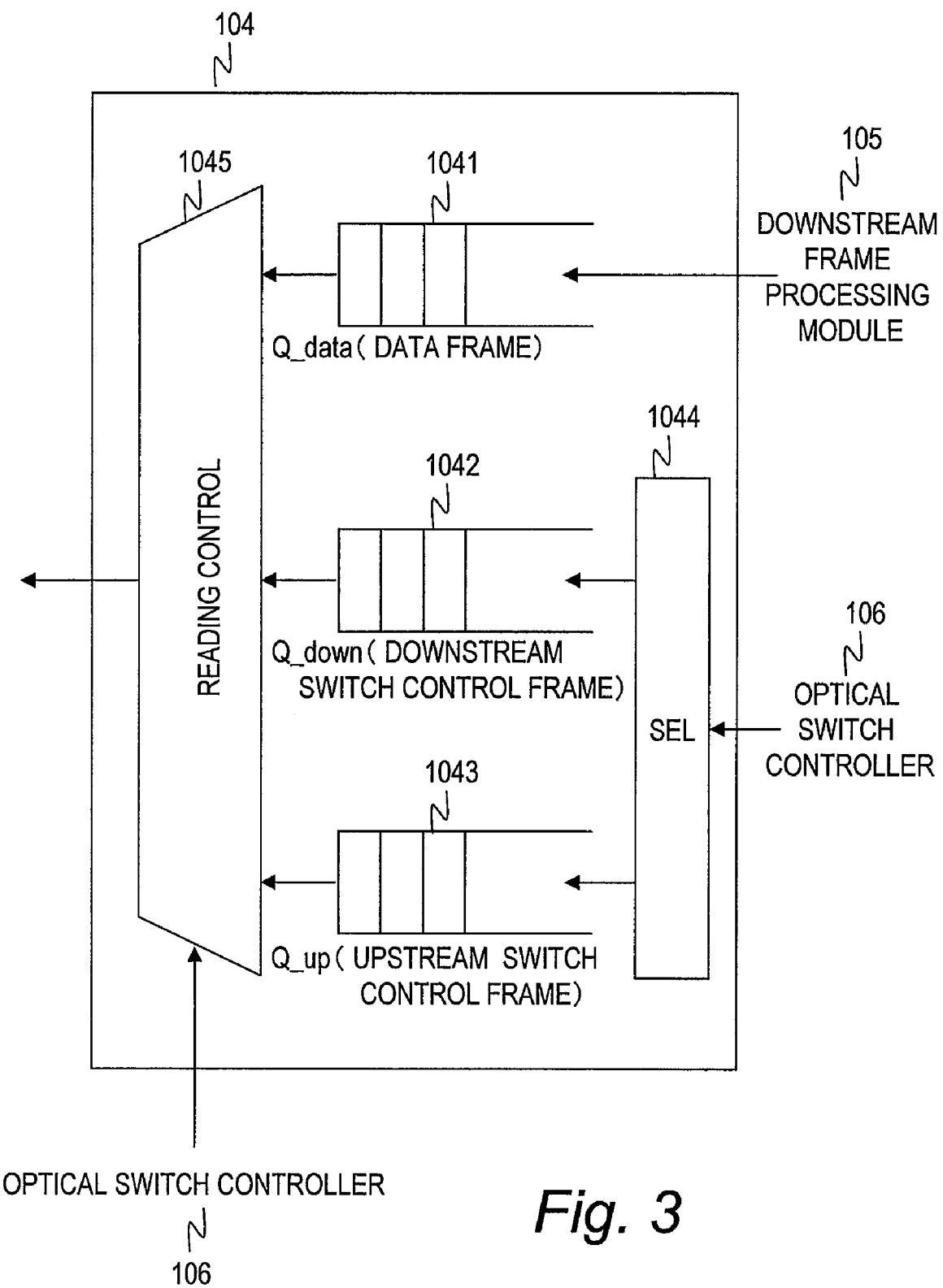
FIG. 3 is a block diagram illustrating a configuration example of a frame transmission control module of the OLT in accordance with the first embodiment of this invention.

FIG. 3 is a block diagram illustrating a configuration example of the frame transmission control module 104 of the OLT 1 according to the first embodiment of this invention.

The frame transmission control module 104 includes a data frame queue (Q_data) 1041, a selector (SEL) 1044, a downstream switch control frame queue (Q_down) 1042, an upstream switch control frame queue (Q_up) 1043, and a reading control module 1045.

The data frame queue (Q_data) 1041 is a transmission queue of transmission frames generated by the downstream frame processing module 105. The selector (SEL) 1044 identifies whether a frame generated by the optical switch controller 106 is a downstream switch control frame or an upstream switch control frame.

The downstream switch control frame queue (Q_down) 1042 is a transmission queue of downstream switch control frames. The upstream switch control frame queue (Q_up) 1043 is a transmission queue of upstream switch control frames.

The reading control module 1045 controls the reading of data out of the queues Q_data 1041, Q_down 1042, and Q_up 1043.

The reading control module 1045 is connected to the optical switch controller 106. The optical switch controller 106 notifies the reading control module 1045 of information about an optical switch control frame generated by the optical switch controller 106 in order to control the reading of transmission frames from the data frame queue 1041, the downstream switch control frame queue 1042, and the upstream switch control frame queue 1043.

Figure 4:
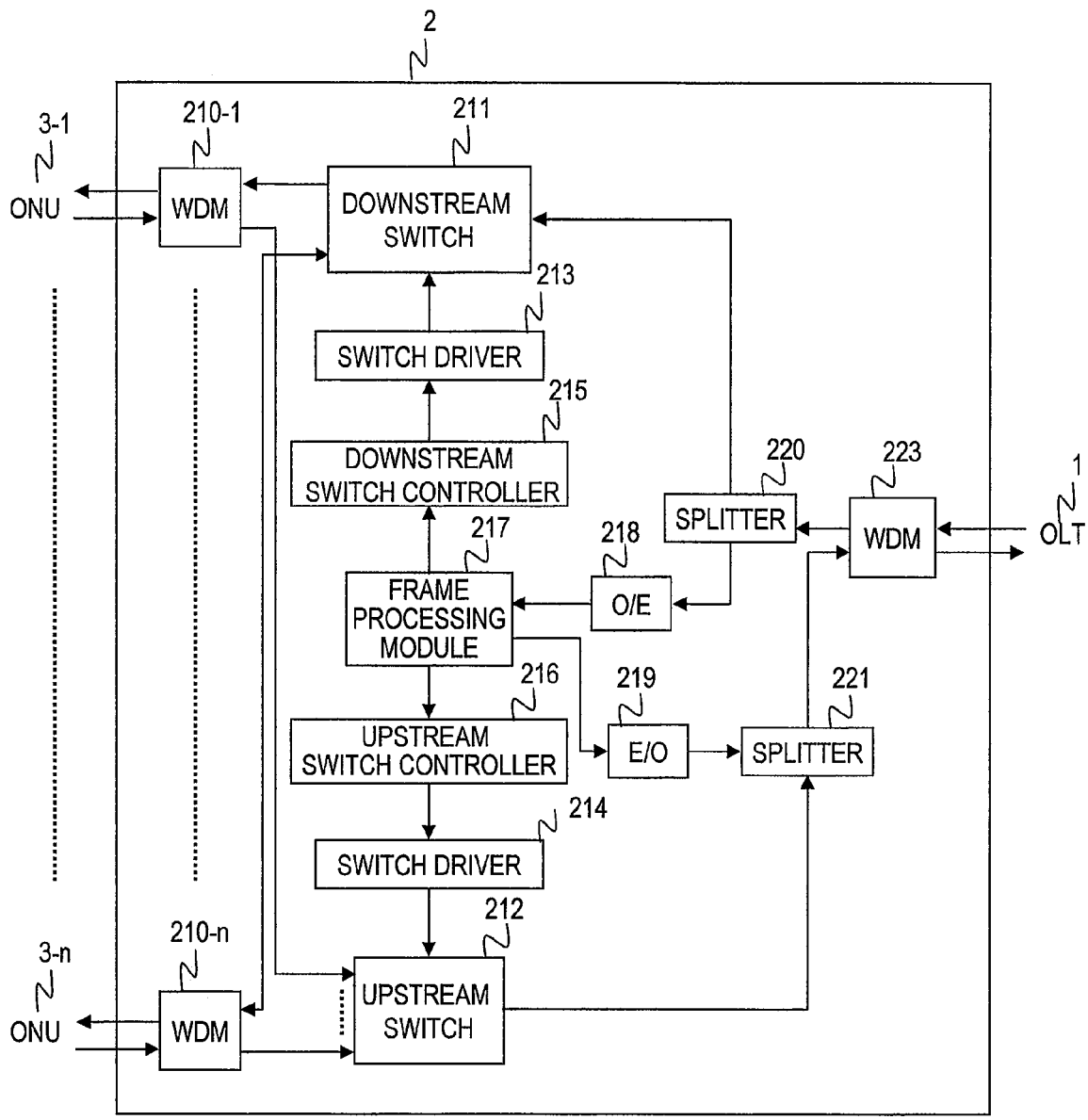
FIG. 4 is a block diagram illustrating a configuration example of an optical switching unit (OSW) in accordance with the first embodiment of this invention.

FIG. 4 is a block diagram illustrating a configuration example of the OSW 2 according to the first embodiment of this invention.

The OSW 2 includes multiplexing/demultiplexing modules (WDM) 210-1 to 210-n, a downstream switch element 211, an upstream switch element 212, a downstream switch driver 213, an upstream switch driver 214, a downstream switch controller 215, an upstream switch controller 216, a frame processing module 217, an optical-electrical signal converter (O/E converter) 218, an electrical-optical signal converter (E/O converter) 219, a downstream splitter 220, an upstream splitter 221, and a multiplexing/demultiplexing module (WDM) 223.

The multiplexing/demultiplexing modules (WDM) 210-1 to 210-n separate and combine an upstream optical signal and a downstream optical signal which undergo wavelength multiplexing between the OSW 2 and the ONUs 3-1 to 3-n, respectively.

The downstream switch element 211 switches communication paths of a signal transmitted from the OSW 2 to the ONUs 3-1 to 3-n. The upstream switch element 212 switches communication paths of an upstream signal transmitted from the ONUs 3-1 to 3-n to the OSW 2.

The downstream switch driver 213 is a circuit that drives the downstream switch element 211. The upstream switch driver 214 is a circuit that drives the upstream switch element 212.

The downstream switch controller 215 controls a switch made by the downstream switch element 211. The upstream switch controller 216 controls a switch made by the upstream switch element 212.

The frame processing module 217 processes a switch control frame received from the OLT 1. The optical-electrical signal converter (O/E converter) 218 converts an optical signal into an electrical signal. The electrical-optical signal converter (E/O converter) 219 converts an electrical signal into an optical signal.

The downstream splitter 220 splits an optical fiber used for downstream optical signal transmission. The upstream splitter 221 splits an optical fiber used for upstream optical signal transmission. The wavelength division multiplexer/de-multiplexer (WDM) 223 separates and combines an upstream optical signal and a downstream optical signal which undergo wavelength multiplexing between the OSW 2 and the OLT 1.

Figures 16B, 17:
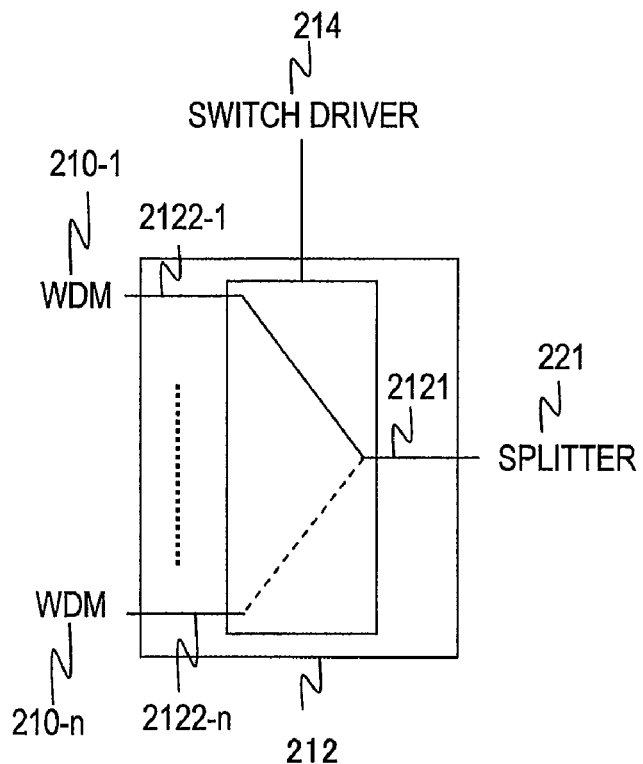
FIG. 16B is a block diagram illustrating an example of a configuration of the switch elements in accordance with the first embodiment of this invention.
FIG. 17 is a diagram illustrating a configuration example of a table in which the association relation between an input/output port number of an optical switch element and an LLID is set in accordance with the first embodiment of this invention.

Configurations of the switch elements 211 and 212 are illustrated in FIGS. 16A and 16B.

As illustrated in FIG. 16A, the downstream switch element 211 includes one input port 2111 and n output ports 2112-1 to 2112-n. Receiving a drive signal from the switch driver 213, the downstream switch element 211 switches communication paths of a downstream signal by opening up a path between the input port 2111 and an arbitrary one of the output ports 2112-1 to 2112-n.

As illustrated in FIG. 16B, the upstream switch element 212 includes one output port 2121 and n input ports 2122-1 to 2122-n. Receiving a drive signal from the switch driver 214, the upstream switch element 212 switches communication paths of an upstream signal by opening up a path between an arbitrary one of the input ports 2122-1 to 2112-n and the output port 2121.

The WDM 223 extracts only optical signals that have a wavelength of the downstream direction from among optical signals that the OSW 2 has received from the OLT 1, and sends the extracted signals to the splitter 220. The splitter 220 splits each of the extracted signals into a signal for the downstream switch element 211 and a signal for the O/E converter 218.

The downstream switch element 211 outputs the input optical signal from an output port that is open for communication with the input port. The optical signal output from the output port is sent to the relevant ONU 3 via the WDM 210.

Meanwhile, the optical signal input to the O/E converter 218 as a result of split in the splitter 220 is converted into an electrical signal. The electrical signal created by the conversion is input to the frame processing module 217. The frame processing module 217 extracts a frame from the input electrical signal, and performs frame processing illustrated in FIG. 14.

FIG. 17 is a diagram illustrating a configuration example of a table in which the association relation between an input/output port number of an optical switch element and an LLID is set according to the first embodiment of this invention.

This table includes an input/output port number of an optical switch element and an LLID assigned to the ONU 3 that is connected to the input/output port. The table is provided in the downstream switch controller 215 or upstream switch controller 216 of the OSW 2.

Figure 10:
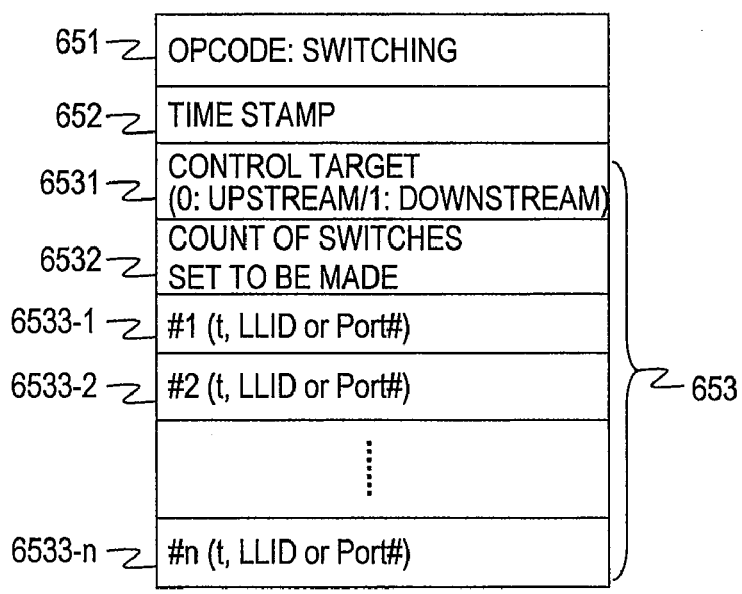
FIG. 10 is a diagram illustrating an example of a format of an optical switch control frame used in the first embodiment of this invention.

The OSW 2 receives an optical switch control frame illustrated in FIG. 10 and extracts an LLID value from the optical switch control frame. The OSW 2 refers to the table illustrated in FIG. 17 to convert the extracted LLID value into an input/output port number. The input/output port number obtained by the conversion is used by the downstream switch controller 215 in determining to which port the downstream switch element 211 should switch, and by the upstream switch controller 216 in determining to which port the upstream switch element 212 should switch.

In this embodiment, it is the OSW 2 that has a table setting the association relation between an input/output port number of a switch element and an LLID assigned to the ONU 3 that is connected to the input/output port. However, the table can be provided in the OLT 1 instead, without causing any obstruction to the switch control of an optical switch element that is described in this embodiment.

Next, a procedure taken by the OLT 1 to control the downstream switch element 211 of the OSW 2 is described.

Figure 5:
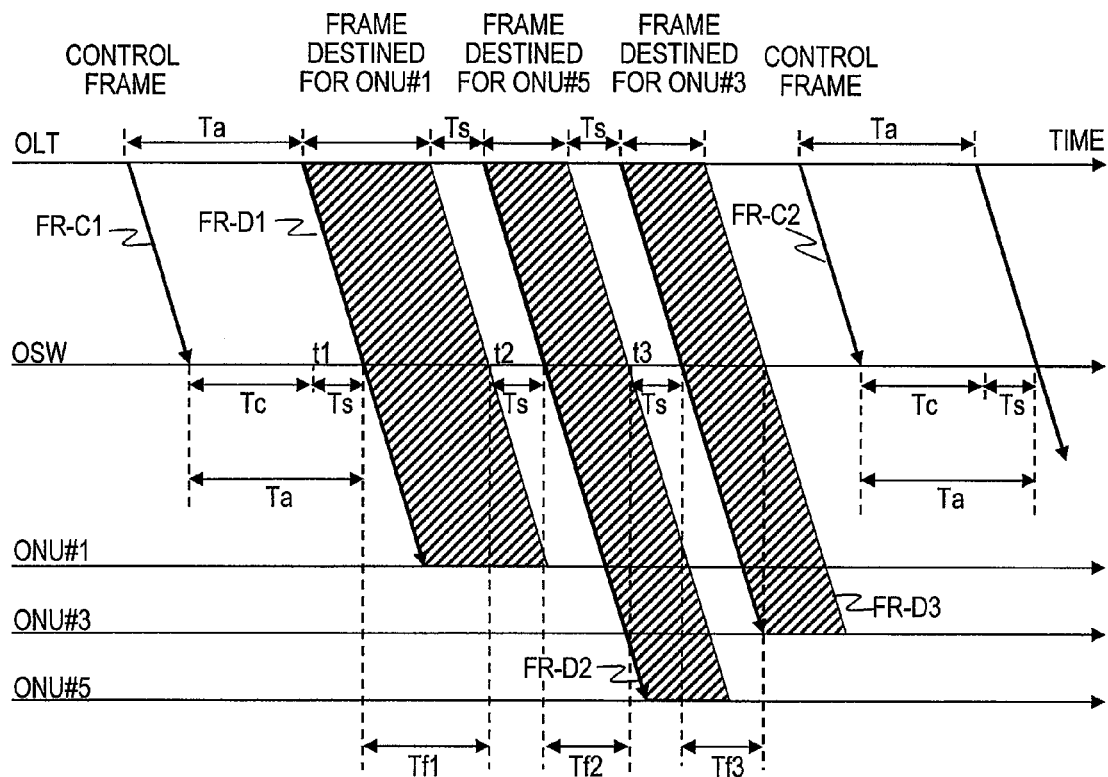
FIG. 5 is a diagram illustrating an example of a sequence in which the OLT controls the downstream switch element of the OSW in accordance with the first embodiment of this invention.

FIG. 5 is a diagram illustrating an example of a sequence in which the OLT 1 controls the downstream switch element 211 of the OSW 2 according to the first embodiment of this invention.

In the example of FIG. 5, a single optical switch control frame is used to control the downstream switch element 211 so that appropriate switches are made for the destinations of subsequent three data frames.

The OLT 1 sends to the OSW 2 an optical switch control frame FR-C1 in which a switching schedule of the downstream switch element 211 reflecting the destinations of the three frames is set. As illustrated in FIG. 5, the switching schedule of the downstream switch element 211 of the OSW 2 that the OLT 1 sets in the optical switch control frame FR-C1 includes the following three switches:

(1) a switch at a time point t1 to an output port that is connected to the ONU 3 #1;

(2) a switch at a time point t2 to an output port that is connected to the ONU 3 #5; and (3) a switch at a time point t3 to an output port that is connected to the ONU 3 #3.

After receiving the optical switch control frame FR-C1, the OSW 2 spends a time period Tc to process the optical switch control frame FR-C1. The time period Tc is a fixed value in the case where the processing is executed by a logic circuit such as an LSI.

At the time point t1, which arrives after the time period Tc elapses since the reception of the optical switch control frame FR-C1, the OSW 2 starts output port switching processing of the downstream switch element 211 and completes the output port switching processing after a time period Ts elapses.

After a time period Ta (length of time that is the sum of the optical switch control frame processing time Tc and the output port switching processing time Ts of the downstream switch element 211 in the OSW 2) elapses since the transmission of the optical switch control frame FR-C1, the OLT 1 sends a data frame FR-D1, which is destined for the ONU 3 #1. The data frame FR-D1 passes through the downstream switch element 211 in which a path between the input port and an output port that is connected to the ONU 3 #1 is open.

The optical switch control frame processing time Tc and the output port switching processing time Ts of the downstream switch element 211 in the OSW 2 are desirably set in the OLT 1 in advance. The OLT 1 can calculate, from the frame length of the data frame FR-D1, a length of time (Tf1) for which the data frame FR-D1, which is sent to the ONU 3 #1 by the OLT 1, takes to pass through the downstream switch element 211.

The time point t2 at which the OSW 2 causes the downstream switch element 211 to make a switch to an output port that is connected to the ONU 3 #5 can be expressed as t1+Ts+Tf1.

When the time period Ts elapses after the transmission of the data frame FR-D1 is completed, the OLT 1 starts the transmission of a data frame FR-D2, which is destined for the ONU 3 #5.

The data frame FR-D2 sent by the OLT 1 passes through the downstream switch element 211 in which a path between the input port and an output port that is connected to the ONU 3 #5 is open at a time point t2+Ts at which output port switching processing of the downstream switch element 211 is completed.

In a similar manner, the OSW 2 starts output port switching processing of the downstream switch element 211 at the time point t3 (t2+Ts+Tf2). When the time period Ts elapses after the transmission of the data frame FR-D2 is completed, the OLT 1 starts the transmission of a data frame FR-D3, which is destined for the ONU 3 #3. Through those processing steps, the data frame FR-D3 passes through the downstream switch element 211 in which a path between the input port and an output port that is connected to the ONU 3 #3 is open.

Figure 6:
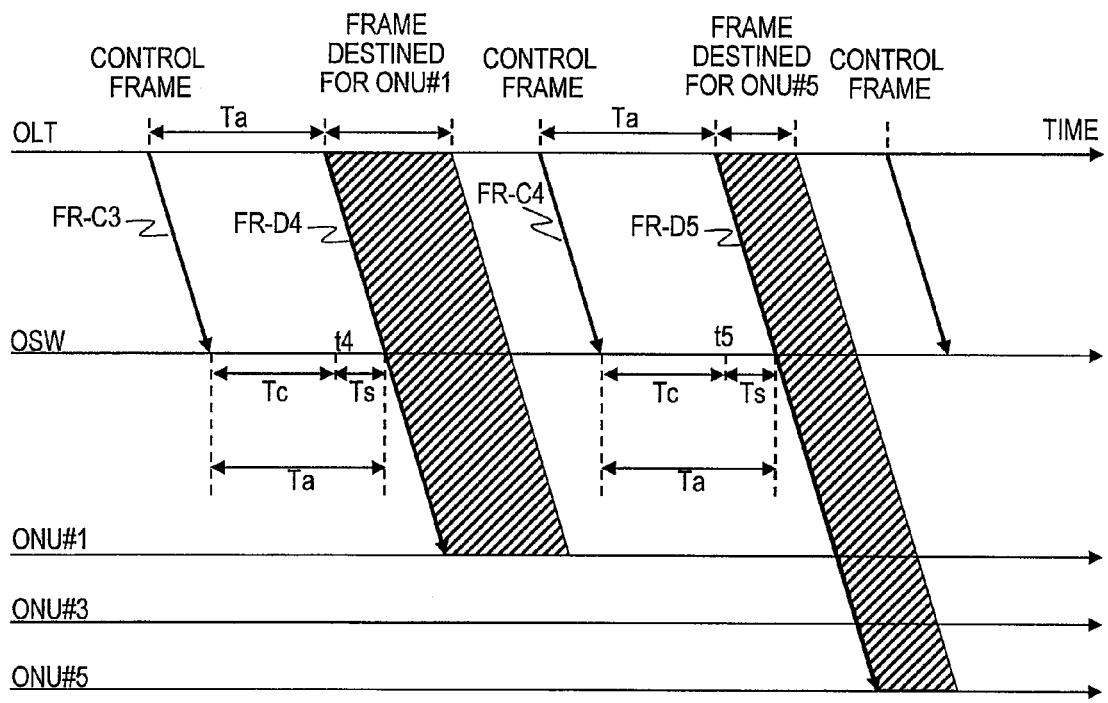
FIG. 6 is a diagram illustrating another example of the sequence in which the OLT controls the downstream switch element of the OSW in accordance with the first embodiment of this invention.

FIG. 6 is a diagram illustrating another example of the sequence in which the OLT 1 controls the downstream switch element 211 of the OSW 2 according to the first embodiment of this invention.

The example of FIG. 5 uses a single optical switch control frame to control the switching timing of an optical switch element for a plurality of subsequent data frames. In the example of FIG. 6, on the other hand, a single control frame is used to control the switching timing of an optical switch element for a single subsequent data frame.

As in the example of FIG. 5, the OLT 1 uses an optical switch control frame FR-C3 to instruct the OSW 2 to switch to an output port that is connected to the ONU 3 #1. The OSW 2 receives the optical switch control frame FR-C3 and, at a time point t4 which arrives after the time period Tc elapses since the reception of the optical switch control frame FR-C3, the OSW 2 starts output port switching processing of the downstream switch element 211.

After the time period Ta (length of time that is the sum of the optical switch control frame processing time Tc and the output port switching processing time Ts of the downstream switch element 211 in the OSW 2) elapses since the transmission of the optical switch control frame FR-C3, the OLT 1 sends a data frame FR-D4, which is destined for the ONU 3 #1. The data frame FR-D4 passes through the downstream switch element 211 in which a path between the input port and an output port that is connected to the ONU 3 #1 is open.

The OLT 1 then uses an optical switch control frame FR-C4 to instruct the OSW 2 to switch to an output port that is connected to the ONU 3 #5. The OSW 2 receives the optical switch control frame FR-C4 and, at a time point t5 which arrives after the time period Tc elapses since the reception of the optical switch control frame FR-C4, the OSW 2 starts output port switching processing of the downstream switch element 211.

After the time period Ta (length of time that is the sum of the optical switch control frame processing time Tc and the output port switching processing time Ts of the downstream switch element 211 in the OSW 2) elapses since the transmission of the optical switch control frame FR-C4, the OLT 1 sends a data frame FR-D5, which is destined for the ONU 3 #5. The data frame FR-D5 passes through the downstream switch element 211 in which a path between the input port and an output port that is connected to the ONU 3 #5 is open.

In the case where a single optical switch control frame is used to control the switching of an optical switch element for a single subsequent data frame as in the example of FIG. 6, information set in the optical switch control frame needs to contain only an output port that is connected to the ONU 3 for which the subsequent data frame is destined, and the OLT 1 does not need to notify the OSW 2 of when to switch output ports of the optical switch.

Next, a procedure taken by the OLT 1 to control the upstream switch element 212 of the OSW 2 is described.

Figure 7:
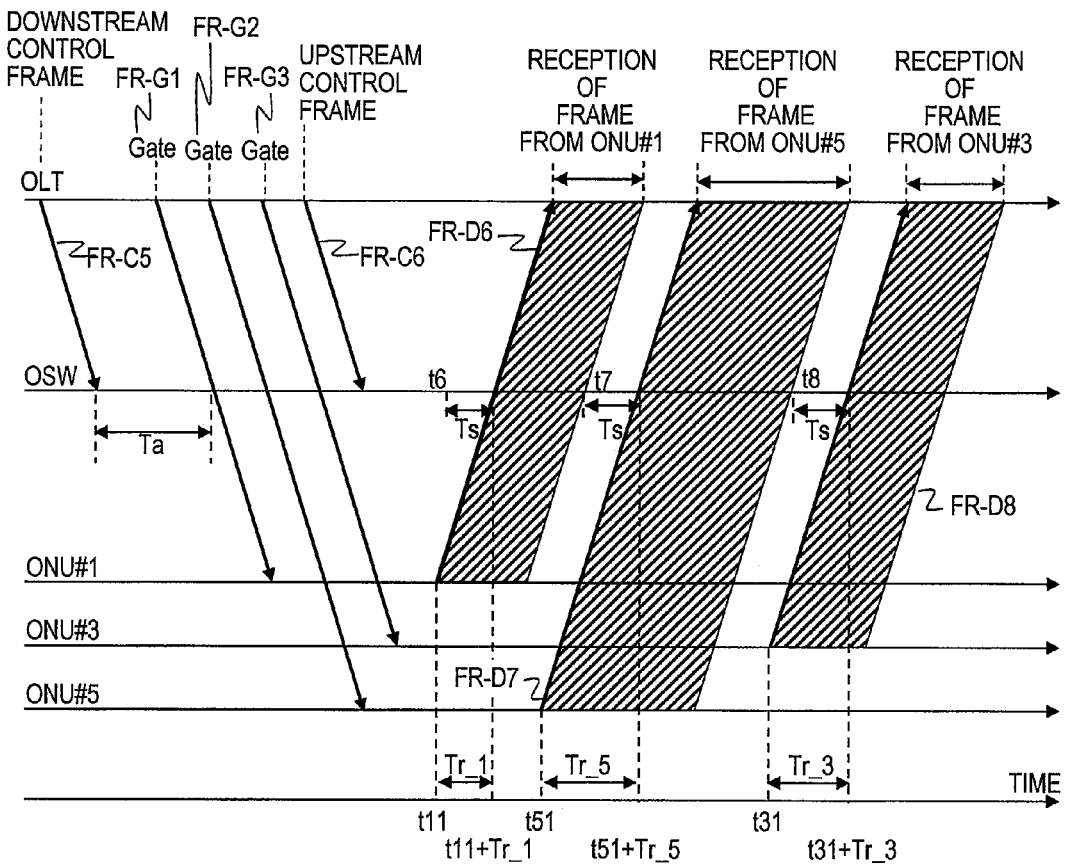
FIG. 7 is a diagram illustrating an example of a sequence in which the OLT controls the upstream switch element of the OSW in accordance with the first embodiment of this invention.

FIG. 7 is a diagram illustrating an example of a sequence in which the OLT 1 controls the upstream switch element 212 of the OSW 2 according to the first embodiment of this invention.

The OLT 1 sends an optical switch control frame FR-C5 to the OSW 2 in order to notify the OSW 2 of a switching schedule of the downstream switch element 211. The OLT 1 next sends, to the ONU 3 #1, the ONU 3 #5, and the ONU 3 #3, Gate messages FR-G1, FR-G2, and FR-G3, respectively, which notify time points when the ONUs 3 are allowed to transmit their respective frames to the OLT 1. The Gate messages are in conformity with a Gate message of MPCP defined in IEEE Std 802. 3TM-2005.

Next, the OLT 1 sends an optical switch control frame FR-C6 to the OSW 2 in order to control the switching of the upstream switch element 212. The OLT 1 sets in the optical switch control frame FR-C6 a switching schedule of the upstream switch element 212 of the OSW 2. In the example of FIG. 7, the switching schedule includes the following three switches:

(1) a switch at a time point t6 to an input port that is connected to the ONU 3 #1;

(2) a switch at a time point t7 to an input port that is connected to the ONU 3 #5; and (3) a switch at a time point t8 to an input port that is connected to the ONU 3 #3.

The time point t6 is expressed as t11+Tr_1-Ts by taking into account a frame transmission time point t11, which is when the ONU 3 #1 is allowed to transmit a frame by permission given from the OLT 1 through the Gate message FR-G1, a propagation delay time Tr_1 of an optical signal traveling from the ONU 3 #1 to the OSW 2, and the time period Ts required for optical switching processing. Similarly, the time point t7 is expressed as t51+Tr_5-Ts by taking into account a frame transmission time point t51, which is when the ONU 3 #5 is allowed to transmit a frame by permission given from the OLT 1 through the Gate message FR-G2, a propagation delay time Tr_5 of an optical signal traveling from the ONU 3 #5 to the OSW 2, and the time period Ts required for optical switching processing. The time point t8 is expressed as t31+Tr_3-Ts by taking into account a frame transmission time point t31, which is when the ONU 3 #3 is allowed to transmit a frame by permission given from the OLT 1 through the Gate message FR-G3, a propagation delay time Tr_3 of an optical signal traveling from the ONU 3 #3 to the OSW 2, and the time period Ts required for optical switching processing.

Receiving the Gate messages FR-G1, FR-G2, and FR-G3, the ONU 3 #1, the ONU 3 #5, and the ONU 3 #3 respectively send data frames FR-D6, FR-D7, and FR-D8 to the OLT 1 in accordance with the schedule notified through the Gate messages FR-G1, FR-G2, and FR-G3.

Upon arrival of the data frame FR-D6 at the upstream switch element 212 of the OSW 2, an input port that is connected to the ONU 3 #1 is open for communication with the output port of the switch element 212. Upon arrival of the data frame FR-D7 at the upstream switch element 212 of the OSW 2, an input port that is connected to the ONU 3 #5 is open for communication with the output port of the switch element 212. Upon arrival of the data frame FR-D8 at the upstream switch element 212 of the OSW 2, an input port that is connected to the ONU 3 #3 is open for communication with the output port of the switch element 212. The data frames FR-D6, FR-D7, and FR-D8 thus arrive at the OLT 1.

Figure 20:
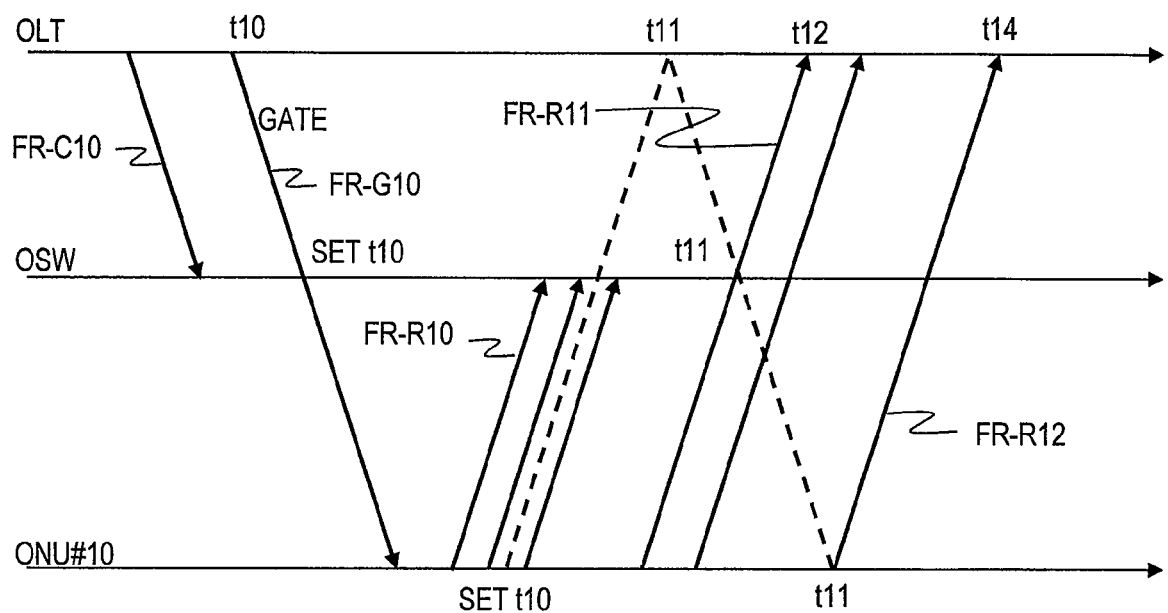
FIG. 20 is an explanatory diagram of an example of how an optical signal propagation delay time is measured for each of the ONUs about an optical signal traveling from the ONU to the OSW in accordance with the first embodiment of this invention.

FIG. 20 is an explanatory diagram of an example of how an optical signal propagation delay time is measured for each of the ONUs 3-1 to 3-*n* about an optical signal traveling from the ONU 3 to the OSW 2 according to the first embodiment of this invention.

The OLT 1 sends a switch control frame FR-C10 to the OSW 2. Receiving the switch control frame FR-C10, the OSW 2 causes the downstream switch element 211 to make a switch to one of its output ports.

Subsequently to the switch control frame FR-C10, the OLT 1 sends a Gate message FR-G 10, which is for discovering the connected ONU 3 #10, to the OSW 2 at a time point t10. A time stamp t10 is set in the Gate message FR-G10.

The OSW 2 monitors the Gate message FR-G10 and sets the time stamp t10, which is set in the Gate message FR-G10, to a local counter. The Gate message FR-G10 passes through an output port of the downstream switch element 211 to which a switch has been made when instructed by the switch control frame FR-C10, and then arrives at the ONU 3 #10.

The ONU 3 #10 receives the Gate message FR-G10 and sets the time stamp t10 in a local stamp.

Through the above-mentioned procedure of IEEE Std 802.3TM-2005, the OLT 1, the OSW 2, and the ONU 3 #10 are synchronized in time.

Once receiving the Gate message FR-G10, the ONU 3 #10 repeatedly sends a Register_Request message FR-R10 until a time point t11 (from FR-R10 to FR-R12).

At the time point t11, the OSW 2 causes the upstream switch element 212 to make a switch to one of its input ports that is connected to the ONU 3 #10. Of the Register_Request messages repeatedly sent by the ONU 3 #10, FR-R11 is the first message to arrive at the OLT 1, and a time point at which the OLT 1 receives FR-R11 is a time point t12. The Register_Request message FR-R12, which is sent by the ONU 3 #10 at the time point t11, passes through the OSW 2 and arrives at the OLT 1 at a time point t14.

A half the difference between t14 and t12 is the optical signal propagation delay time between the ONU 3 #10 and the OSW 2.

Figure 11:
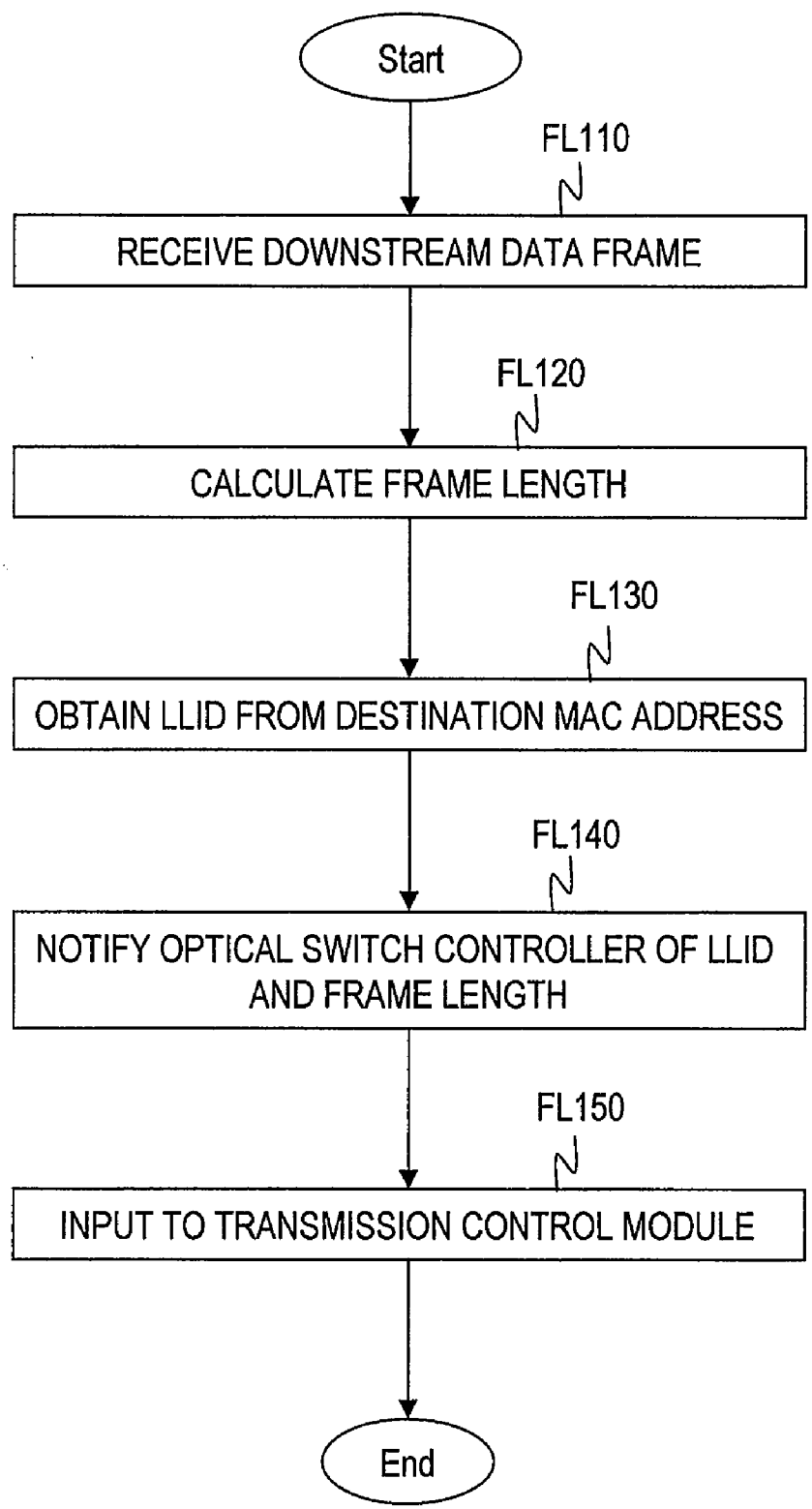
FIG. 11 is a flow chart illustrating an example of a processing procedure that is executed by the downstream frame processing module of the OLT in the first embodiment of this invention.

FIG. 11 is a flow chart illustrating an example of a processing procedure that is executed by the downstream frame processing module 105 of the OLT 1 according to the first embodiment of this invention.

The downstream frame processing module 105 of the OLT 1 which is illustrated in FIG. 2 receives a downstream data frame (FL110) and calculates the frame length of the received data frame (FL120). The frame processing module 105 next searches the MAC address-LLID association table of FIG. 15 to obtain an LLID value that is associated with a destination MAC address attached to the received data frame (FL130).

The frame processing module 105 notifies the optical switch controller 106 of the frame length obtained in Step FL120 and the LLID value obtained in Step FL130 (FL140). The frame processing module 105 then inputs the received data frame in the frame transmission control module 104 (FL150) and ends downstream frame processing.

Next, a data frame transmission procedure taken by the reading control module 1045, which is provided in the frame transmission control module 104 of the OLT 1 as illustrated in FIG. 3, is described.

Figure 18:
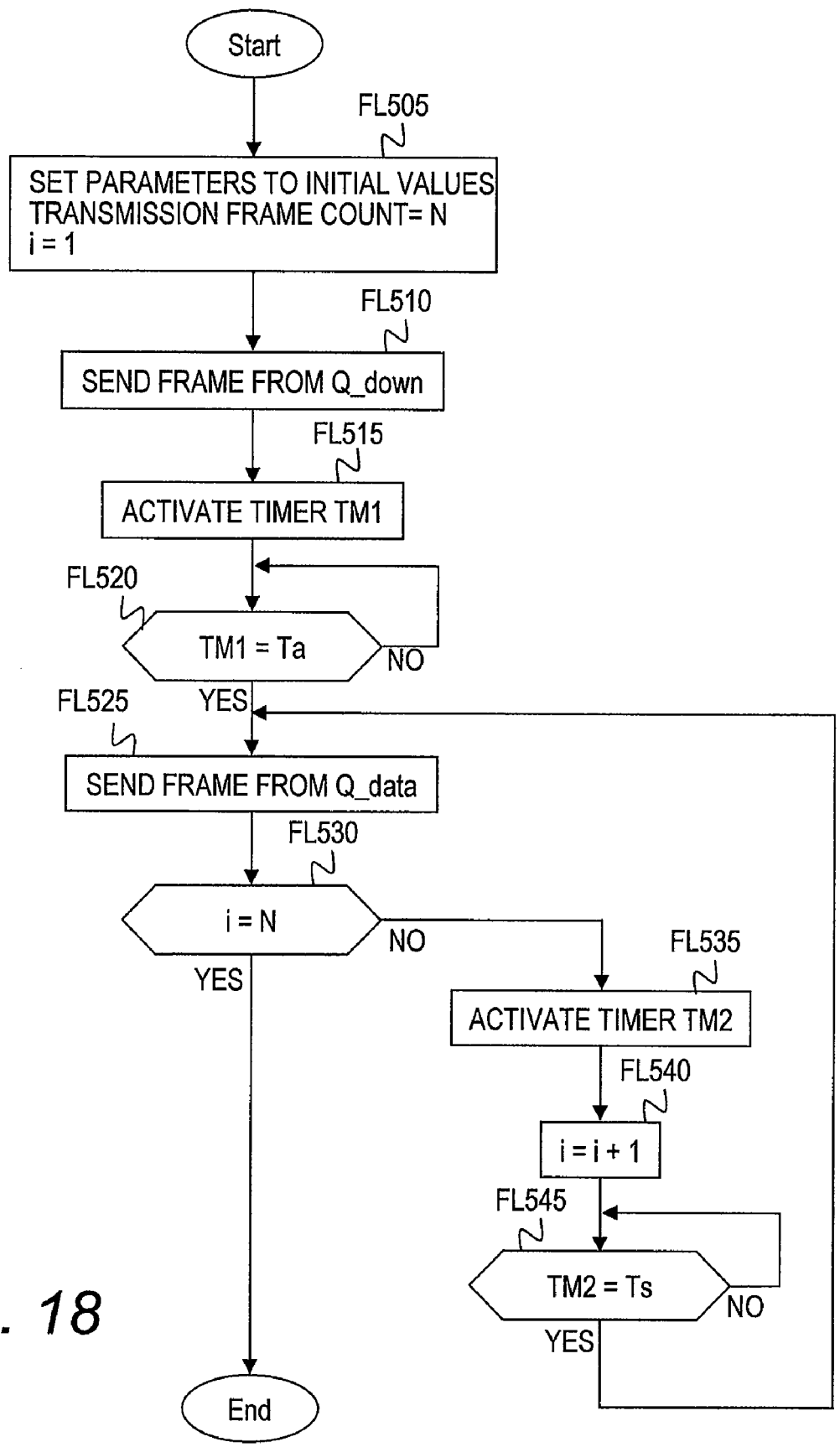
FIG. 18 is a flow chart illustrating an example of the data frame transmission procedure that is executed by the reading control module of the OLT in accordance with the first embodiment of this invention.

FIG. 18 is a flow chart illustrating an example of the data frame transmission procedure that is executed by the reading control module 1045 of the OLT 1 according to the first embodiment of this invention.

First, the reading control module 1045 sets a value N, which is the count of data frames following a single optical switch control frame, and the value of a counter "i", which represents the count of actually transmitted data frames, to "1" (FL505). The value N of the data frame count is notified from the optical switch controller 106.

An optical switch control frame for controlling the downstream switch element 211 is then read from the downstream switch control frame queue 1042 and, after the read optical switch control frame is transmitted (FL510), a timer TM1 is activated (FL515).

When the value of the timer TM1 reaches the time Ta described with reference to FIG. 5 (Ta is the sum of the time period Tc which the OSW 2 requires to process an optical switch control frame and the time period Ts which the OSW 2 requires to complete the switching processing of the downstream switch element 211) (FL520), one data frame is taken out of the data frame queue (Q_data) 1041. The taken-out data frame is transmitted (FL525).

The value of the counter "i" and the transmission frame count N are compared at this point (FL530). When i=N, it means that all data frames whose transmission timing is specified by one optical switch control frame have been transmitted, and the data frame transmission processing is therefore ended (FL550). When "i=N" is not satisfied, it means that some data frames remain to be transmitted as instructed by one optical switch control frame. Accordingly, a timer TM2 for counting up to a time to transmit a subsequent data frame is activated (FL535) and the value of the counter "i" is incremented (FL540).

When the value of the timer TM2 reaches Ts described with reference to FIG. 5 (Ts is a time period required for the switching processing of the downstream switch element 211), the reading control module 1045 returns to Step FL525 to take one data frame out of the data frame queue (Q_data) 1041 and to transmit the taken-out data frame.

The same processing is repeated until the value of the counter "i" reaches N.

Figure 12:
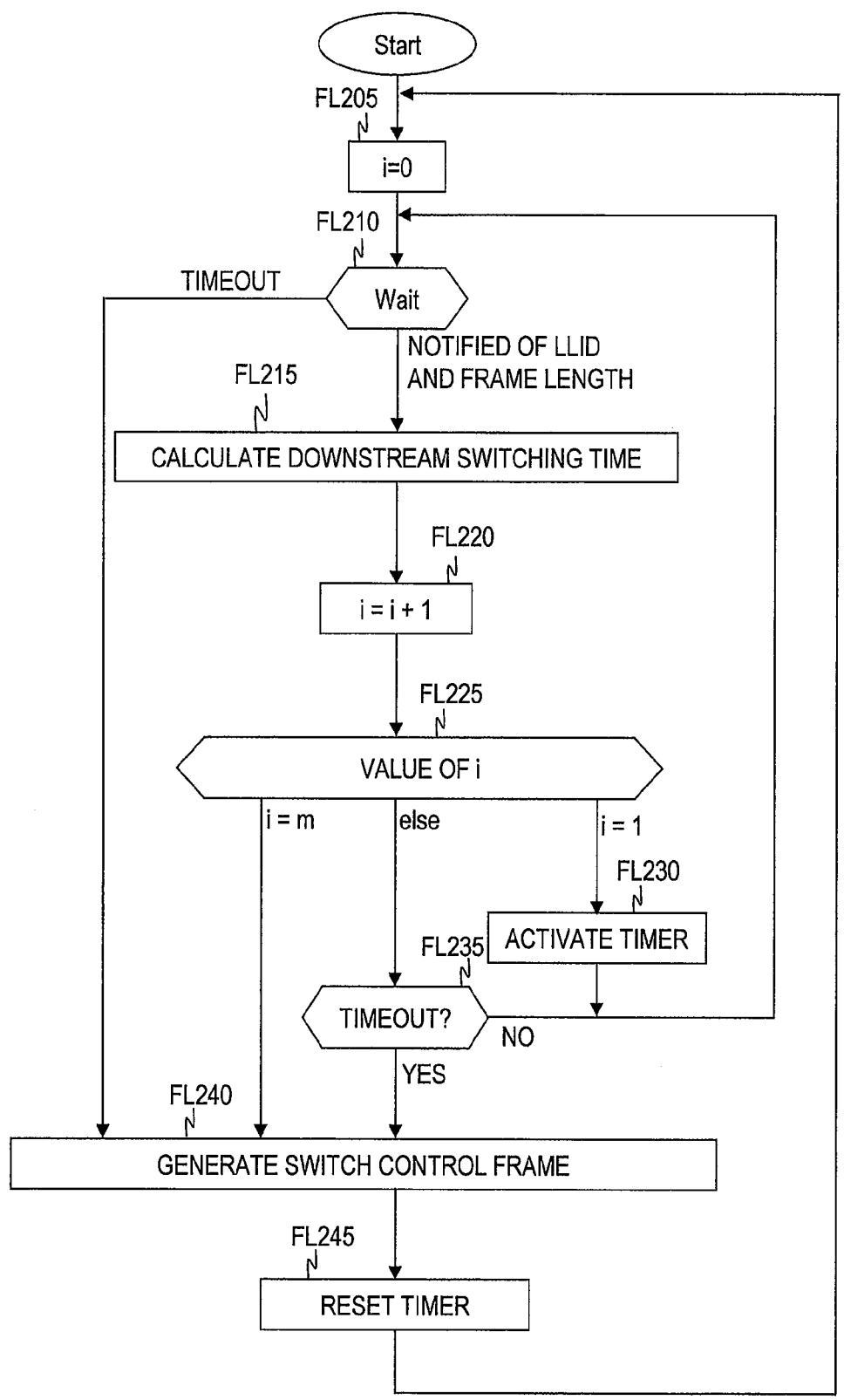
FIG. 12 is a flow chart illustrating an example of a processing procedure relevant to downstream communication control which is executed by the optical switch controller of the OLT in accordance with the first embodiment of this invention.

FIG. 12 is a flow chart illustrating an example of a processing procedure relevant to downstream communication control which is executed by the optical switch controller 106 of the OLT 1 according to the first embodiment of this invention.

The optical switch controller 106 of the OLT 1 which is illustrated in FIG. 2 performs initialization (FL200), then sets the value of the frame counter "i" to "0" (FL205), and shifts to a waiting state (FL210).

When notified by the downstream frame processing module 105 of the frame length and LLID of a transmission frame while being in the waiting state FL210, the optical switch controller 106 calculates a switching time of the downstream switch element 211 from the notified frame length of the transmission frame so that a switch is made at the time when the frame passes through the OSW 2 (FL215).

Next, the optical switch controller 106 increments the value of the frame counter "i" (FL220) and identifies the counter value (FL225). When the value of the frame counter "P" matches a threshold "m", which is determined in advance, data frames to be controlled have been accumulated to a given maximum count, and the optical switch controller 106 therefore moves to Step FL240. The threshold "m" is the maximum count of downstream data frames that follow a single switch control frame.

When the value of the frame counter "i" is "1" in Step FL225, the optical switch controller 106 activates a timer (FL230) and shifts to a waiting state (FL210).

When the value of the frame counter "i" matches neither the threshold "m" nor "1", the optical switch controller 106 determines whether or not the timer has finished counting (FL235). In the case where the timer has finished counting, the optical switch controller 106 moves to Step FL240. In the case where the timer has not finished counting, the optical switch controller 106 again shifts to a waiting state (FL210).

A switch control frame is generated in Step FL240. Thereafter, the optical switch controller 106 resets the timer (FL245) and then moves to Step FL205, where the optical switch controller 106 sets the value of the frame counter "i" to "0" in order to generate the next switch control frame, and shifts to the waiting state FL210.

When the timer activated in Step FL230 finishes counting while the optical switch controller 106 is in the waiting state FL210, the optical switch controller 106 moves to Step FL240 to generate a switch control frame as in the case of moving from Steps FL225, FL230, and FL235 described above.

This embodiment uses a maximum data frame count and a timer in controlling the generation of a switch control frame as a result of taking into consideration the fact that heavy traffic equals increased delay when the count of downstream data frames following a single switch control frame exceeds a maximum count m whereas, when data frame accumulation continues after the timer finishes counting up to a given time, light traffic equals increased delay. Alternatively, the generation of a switch control frame may be controlled with one of the maximum data frame count and the timer.

Figure 13:
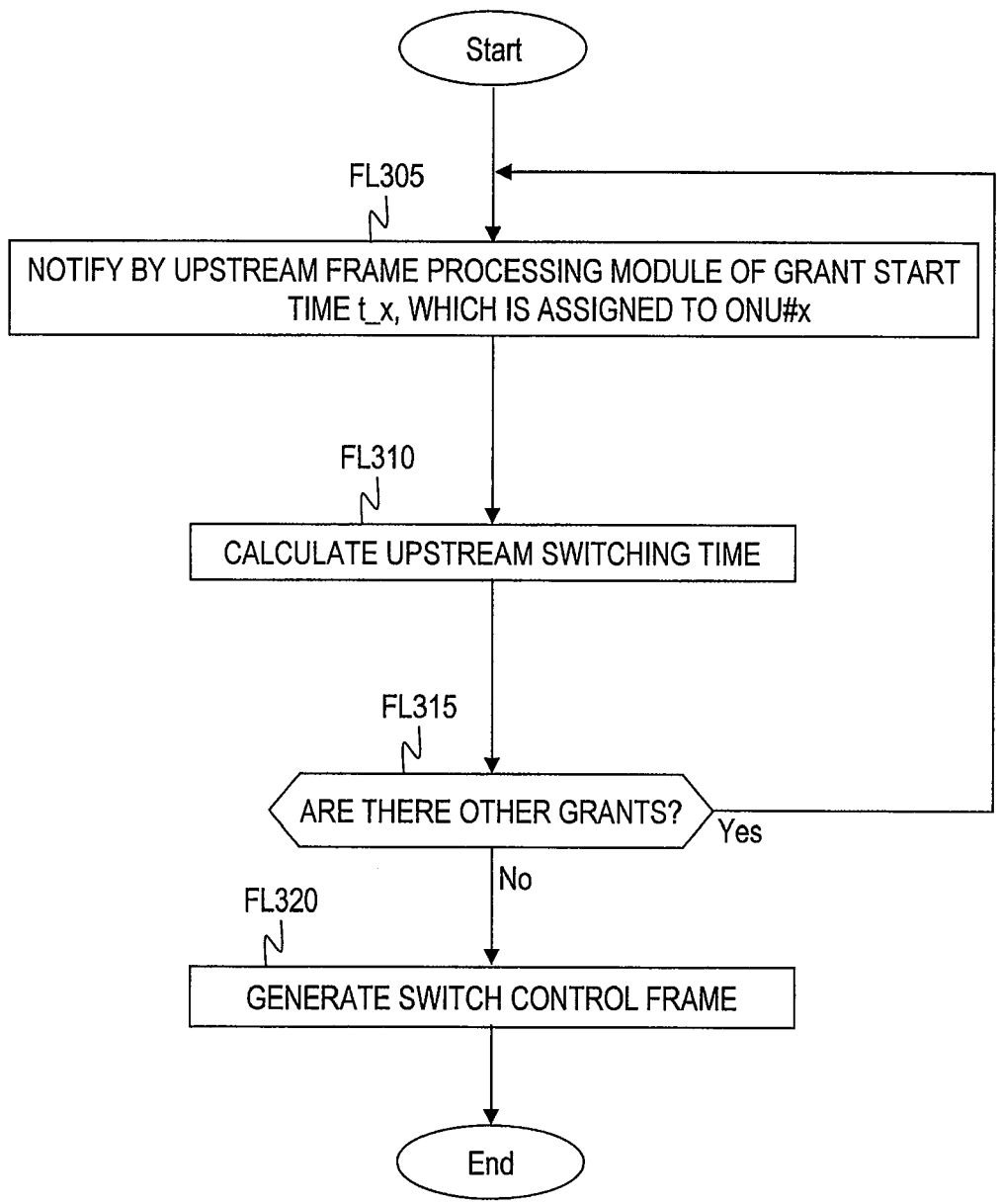
FIG. 13 is a flow chart illustrating an example of a processing procedure relevant to upstream communication control which is executed by the optical switch controller of the OLT in accordance with the first embodiment of this invention.

FIG. 13 is a flow chart illustrating an example of a processing procedure relevant to upstream communication control which is executed by the optical switch controller 106 of the OLT 1 according to the first embodiment of this invention.

The optical switch controller 106 is notified by the protocol processing module 108 of a Grant start time t_x, which is set in a Gate message destined for the ONU 3 #x (FL305). The optical switch controller 106 then calculates an upstream switching time (FL310). The upstream switching time is calculated by the method described with reference to FIG. 7.

Next, the optical switch controller 106 determines whether or not there are Gate messages for other ONUs 3 (FL315). In the case where Gate messages for other ONUs 3 are found, the optical switch controller 106 returns to Step FL305. In the case where no Gage messages for other ONUs 3 are found, the optical switch controller 106 generates an upstream optical switch control frame (FL320) and ends the processing.

Figure 14:
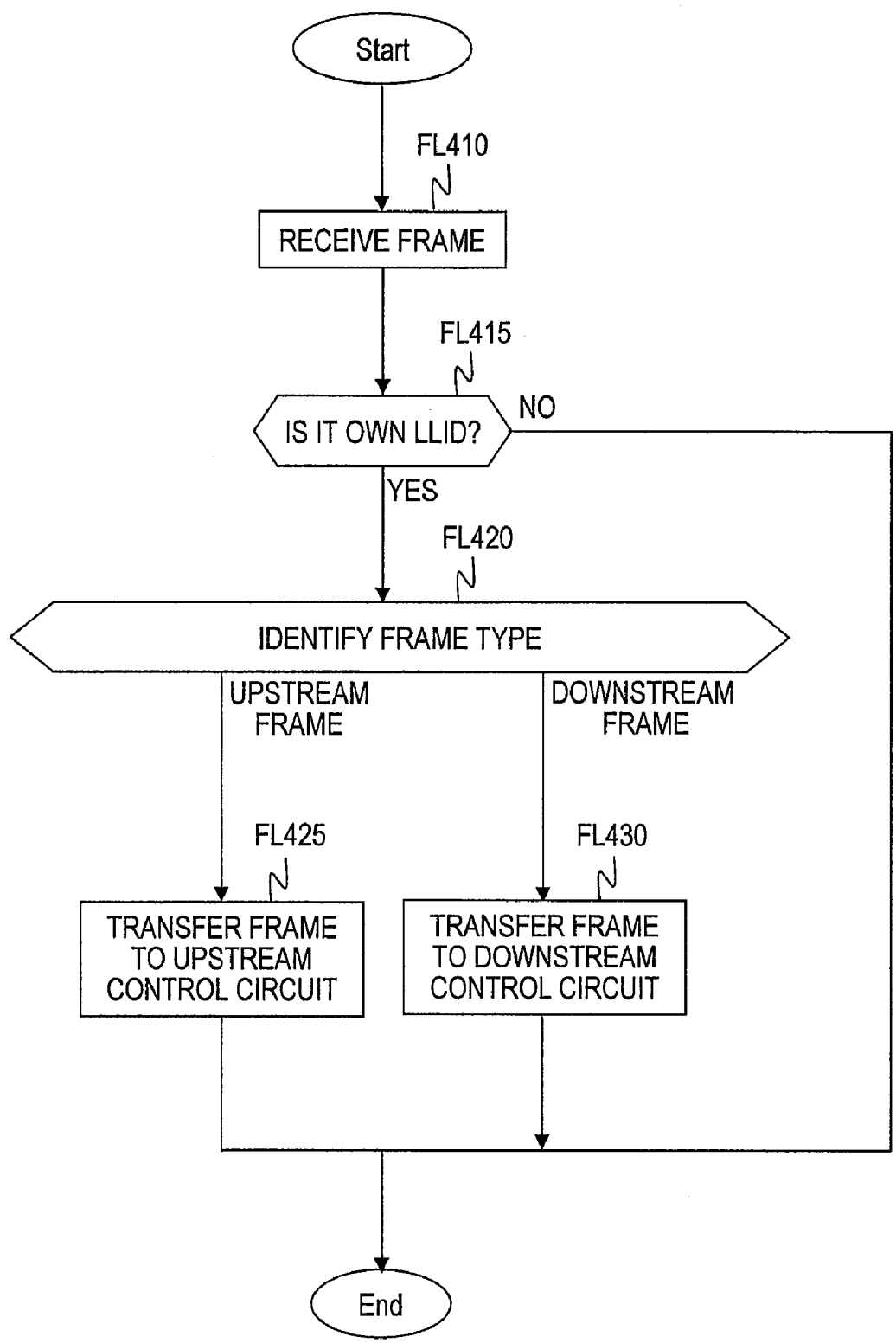
FIG. 14 is a flow chart illustrating an example of a processing procedure that is executed by the frame processing module of the OSW in accordance with the first embodiment of this invention.

FIG. 14 is a flow chart illustrating an example of a processing procedure that is executed by the frame processing module 217 of the OSW 2 according to the first embodiment of this invention.

The splitter 220 splits an optical signal received by the OSW 2 of FIG. 4 into a signal for the downstream switch element 211 and a signal for the O/E converter 218. The O/E converter 218 converts the input optical signal into an electrical signal. The electrical signal obtained by the conversion is sent to the frame processing module 217 to be made into a frame in the frame processing module 217 (FL410).

The frame processing module 217 refers to an LLID attached to the preamble part of the frame (FL415). When the LLID attached to the received frame matches an LLID that is allocated to its own OSW 2, the frame processing module 217 proceeds to Step FL420. When the LLID attached to the received frame does not match an LLID that is allocated to its own OSW 2, the frame processing module 217 ends the processing (FL450).

Figure 9:
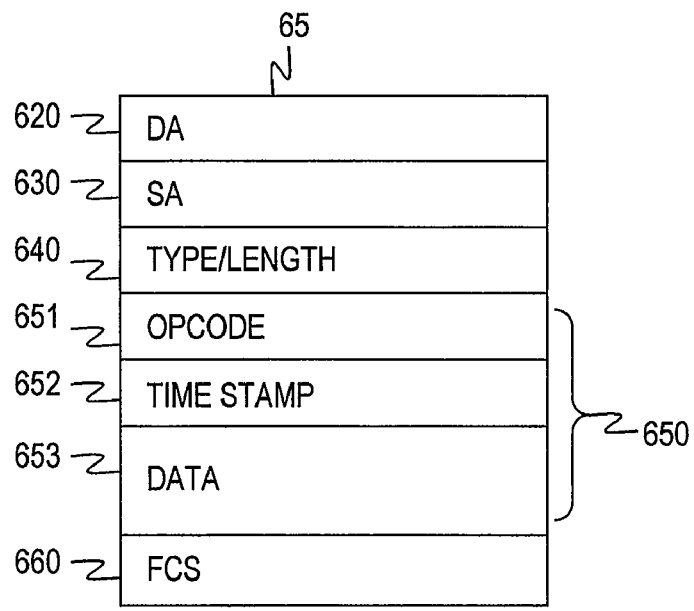
FIG. 9 is a diagram illustrating the format of an MPCPDU used in the first embodiment of this invention.

In the case where the LLID attached to the received frame matches an LLID that is allocated to its own OSW 2, the frame processing module 217 identifies the type of the received frame (FL420). When values set in the received frame as a type/length 640 and opcode 651 of an MPCPDU 65, which is illustrated in FIG. 9, match values allocated to optical switch control frames, the frame processing module 217 determines whether the optical switch control frame is a frame for upstream switch control or a frame for downstream switch control from a value set in a control target field 6531 of the optical switch control frame which is illustrated in FIG. 10.

When it is determined as a result that the received frame is an optical switch control frame for upstream switch control, the frame processing module 217 transfers the optical switch control frame to the upstream switch controller 216 of the OSW 2 (FL425), and ends the processing (FL440). When the received frame is found to be an optical switch control frame for downstream switch control, on the other hand, the frame processing module 217 transfers the optical switch control frame to the downstream switch controller 215 of the OSW 2 (FL430), and ends the processing (FL440).

A processing step may be added which is executed when it is determined in Step FL420 that the received frame is not an optical switch control frame.

The upstream switch controller 216 and the downstream switch controller 215 to which the switch control frame is transferred in Step FL425 and Step FL430 control the switching of the upstream switch element 212 and the downstream switch element 211, respectively, with the use of information set in the switch control frame.

In the optical access system of this embodiment, the frame format of an EPON can be employed as the format of frames transmitted and received by the OLT 1, the OSW 2, and the ONUs 3.

Figure 8:
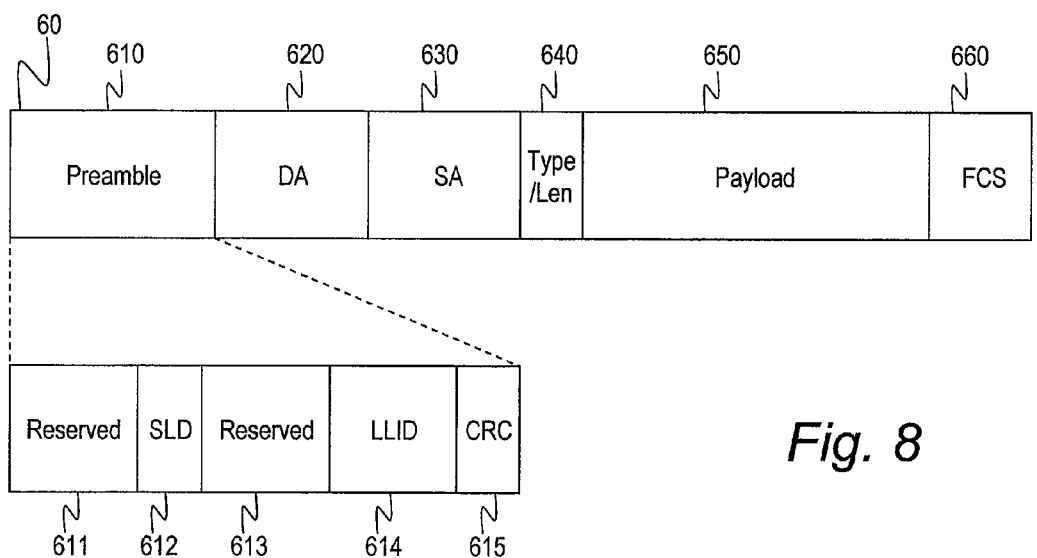
FIG. 8 is a diagram illustrating the frame format of an EPON used in the first embodiment of this invention.

FIG. 8 is a diagram illustrating the frame format of an EPON that is used in the first embodiment of this invention.

A frame 60 of an EPON includes a preamble field 610, a destination MAC address (DA) field 620, a source MAC address (SA) field 630, a type/length field 640 for indicating the frame type or the frame length, a payload field 650, and a frame check sequence (FCS) field 660.

The field for the preamble 610 includes reserved fields 611 and 613, a Start of LLID Delimiter (SLD) field 612, a logical link identifier (LLID) field 614, and a CRC (Cyclic Redundancy Check) field 615 for checking for a code error.

The SLD 612 is a field for indicating that a logical link identifier (LLID) is described in the preamble field. The LLID 614 indicates a logical identifier that the OLT 1 allocates to each ONU 3 or to the OSW 2.

In the optical access system of this embodiment, a format equivalent to a Multipoint Control Protocol Data Unit (MPCPDU) defined in IEEE Std 802. 3TM-2005 can be employed as the format of optical switch control frames sent from the OLT 1 to the OSW 2.

FIG. 9 is a diagram illustrating the format of an MPCPDU that is used in the first embodiment of this invention.

An MPCPDU 65 includes the DA 620, SA 630, type/length field 640, payload 650, and FCS 660 of the EPON frame 60 illustrated in FIG. 8. The payload 650 includes an opcode 651, a time stamp 652, and data 653.

FIG. 10 is a diagram illustrating an example of the format of an optical switch control frame that is used in the first embodiment of this invention. FIG. 10 illustrates only the part of the payload 650 of the EPON frame 60.

In an optical switch control frame, a value indicating that the frame is a switch control frame is set as the opcode 651. Information set as the data 653, which is next to the time stamp 652, includes the control target 6531, which indicates whether this optical switch control frame is a frame for controlling the upstream switch or the downstream switch, a set count 6532 of switches contained in a switching schedule of an optical switch which is set in this optical switch control frame, and associations 6533 (6533-1 to 6533-*n*) between a switching time of the optical switch and an LLID (or a port number of the optical switch).

In the optical access system of this embodiment, a format equivalent to that of a frame used in a GPON (ITU-T Recommendation G.984.1) can be employed as the format of frames transmitted and received by the OLT 1, the OSW 2, and the ONUs 3.

Figure 19A:
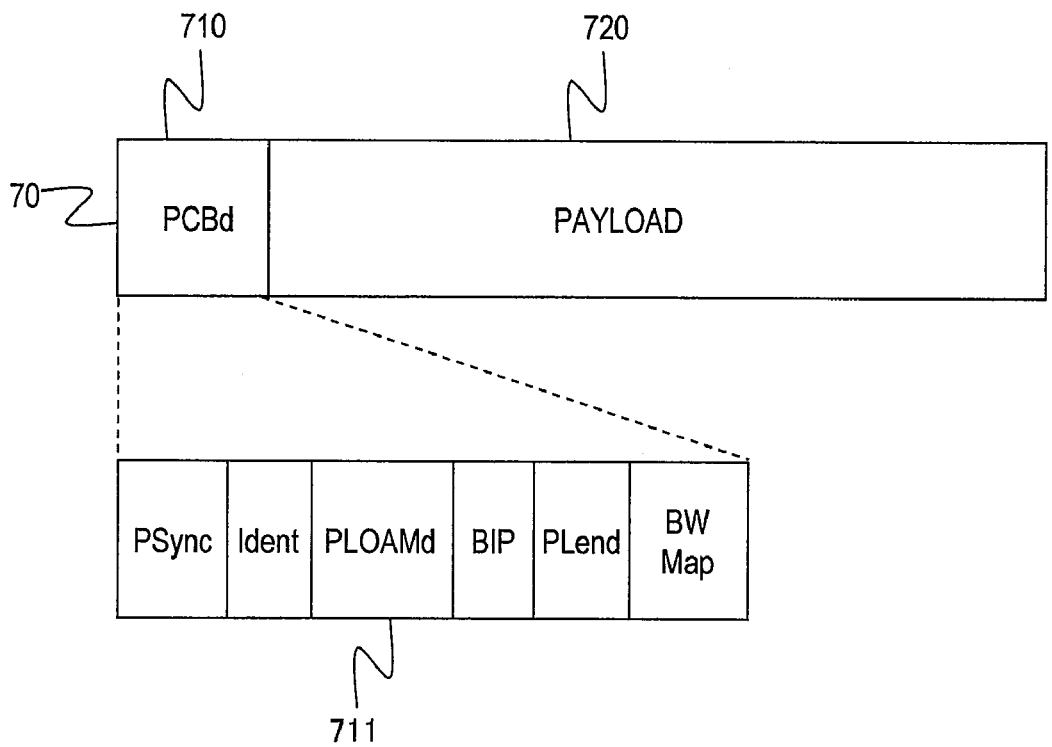
FIG. 19A is a diagram illustrating the format of a downstream frame that is used in a GPON in accordance with the first embodiment of this invention.

FIG. 19A is a diagram illustrating the format of a downstream frame that is used in a GPON according to the first embodiment of this invention. A downstream frame 70 is provided with a PCBd field 710 and a payload 720.

Figure 19B:
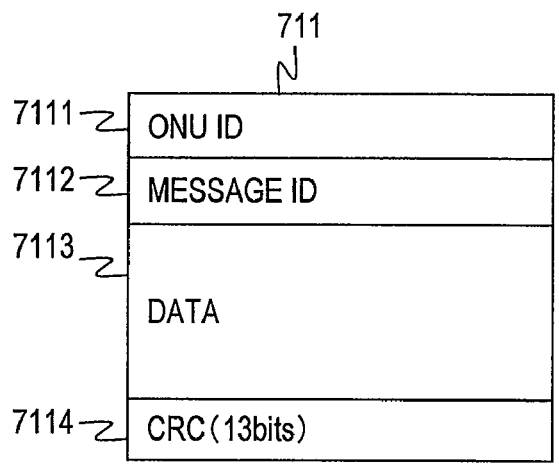
FIG. 19B is a diagram illustrating the format of a Physical Layer OAM (PLOAM) used in the first embodiment of this invention.

FIG. 19B is a diagram illustrating the format of a Physical Layer OAM (PLOAM) 711, which is provided in the PCBd field 710 in the first embodiment of this invention. The PLOAM 711 includes an ONU ID field 7111, a message ID field 7112, a data field 7113, and a CRC field 7114.

In the case where a format equivalent to that of a GPON frame is employed for optical switch control frames, this invention can be carried out by mapping the frame of FIGS. 9 and 10 onto the payload 720 of the downstream frame 70 illustrated in FIG. 19A, or onto the data 7113 of the PLOAM illustrated in FIG. 19B.

Next, a second embodiment of this invention is described.

Figure 21:
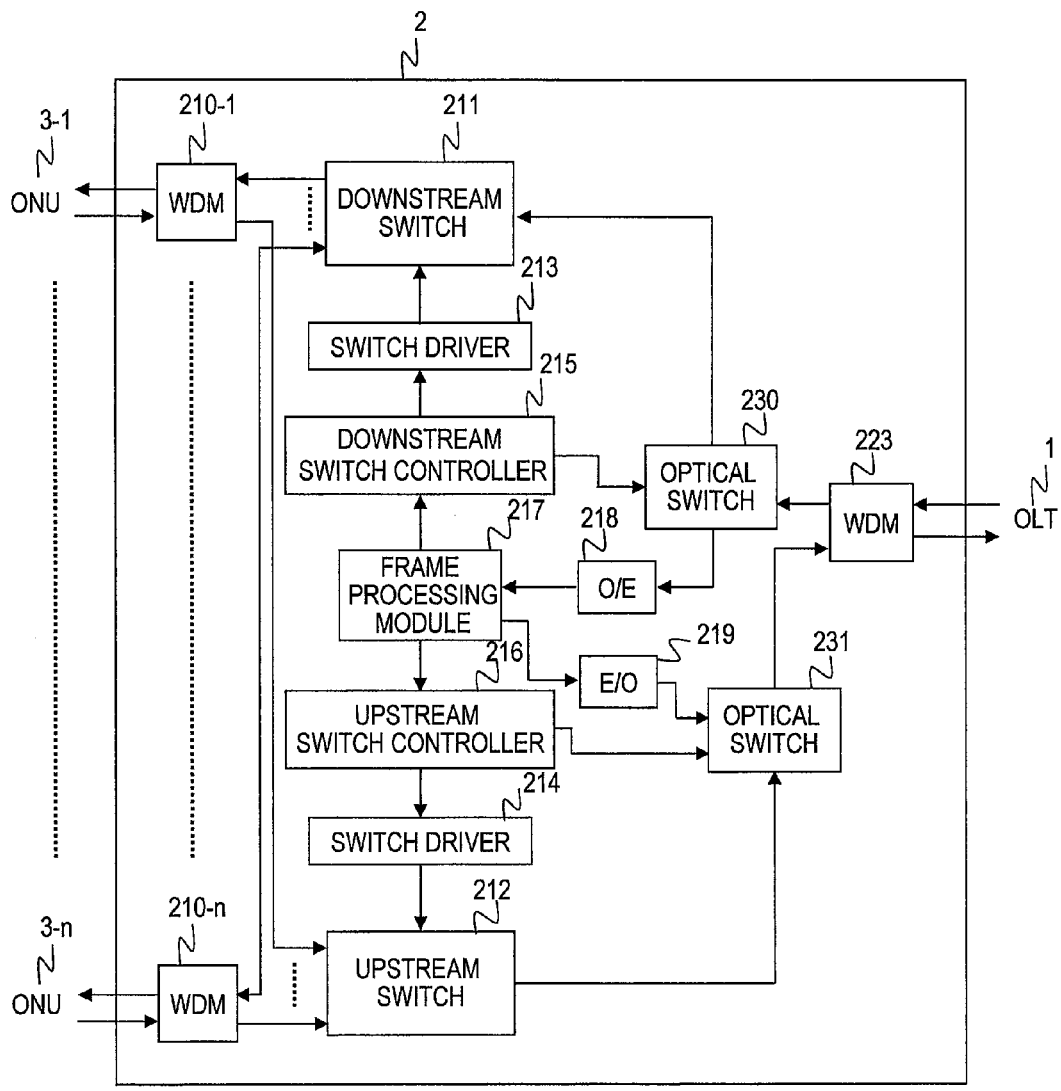
FIG. 21 is a block diagram illustrating a configuration example of an OSW in accordance with a second embodiment of this invention.

FIG. 21 is a block diagram illustrating a configuration example of an OSW 2 according to the second embodiment of this invention.

The OSW 2 of the second embodiment differs from the OSW 2 of the first embodiment which is described above with reference to FIG. 4 in that a downstream optical signal sent from the OLT 1 is split by an optical switch 230 instead of a splitter.

Specifically, in the above-mentioned OSW 2 of the first embodiment, a downstream optical signal received from the OLT 1 is distributed to the downstream switch element and the O/E converter by a splitter. In the OSW 2 of the second embodiment, a downstream optical signal received from the OLT 1 is delivered to any one of the downstream switch element 211 and the O/E converter 218 by the optical switch 230, which has one input port and two output ports.

Further, in the above-mentioned OSW 2 of the first embodiment, the splitter 221 couples an optical signal from the E/O converter and an optical signal from the upstream switch element whereas, in the OSW 2 of the second embodiment, an optical signal from the E/O converter 219 and an optical signal from the upstream switch element 212 are coupled by an optical switch 231, which has two input ports and one output port. In other words, any one of a signal that arrives at the optical switch 231 from the E/O converter 219 and a signal that arrives at the optical switch 231 from the upstream switch element 212 is transmitted to the WDM 223.

The optical switch 230 is connected to the downstream switch controller 215. The downstream switch controller 215 controls the switching of output ports of the optical switch 230. The downstream switch controller 215 periodically makes a switch to an output port of the optical switch 230 that is for a signal to be output to the downstream switch element 211, or to an output port of the optical switch 230 that is for a signal to be output to the O/E converter 218.

The OSW 2 receives an optical switch control frame at the time when the optical switch 230 makes a switch to the output port for the O/E converter 218 in the manner described with reference to FIGS. 5 and 6. The OSW 2 receives an optical signal that is a data frame destined for one of the ONUs 3 at the time when the optical switch 230 makes a switch to the output port for the downstream switch element 211 in the manner described with reference to FIGS. 5 and 6.

The optical switch 231 is connected to the upstream switch controller 216. The upstream switch controller 216 controls the switching of input ports of the optical switch 231. The upstream switch controller 216 periodically makes a switch to an input port of the optical switch 231 that is for a signal input from the upstream switch element 212, or to an input port of the optical switch 231 that is for a signal input from the E/O converter.

The OSW 2 receives an optical signal relevant to a data frame sent from one of the ONUs 3 to the OLT 1 at a time when the optical switch 231 makes a switch to the input port for the upstream switch element 212 in the manner described with reference to FIG. 7.

As has been described above, the second embodiment of this invention uses an optical switch to split an optical signal and can accordingly avoid the attenuation of an optical signal that is caused by a splitter.

While the present invention has been described in detail and pictorially in the accompanying drawings, the present invention is not limited to such detail but covers various obvious modifications and equivalent arrangements, which fall within the purview of the appended claims.

What is claimed is:

1. An optical access system, comprising:
an optical line terminal which is connected to another network;
a plurality of optical network units which are each connected to a user terminal; and
an optical switching unit which is implemented between the optical line terminal and the plurality of optical network units to switch optical communication paths between the optical line terminal and the plurality of optical network units, wherein:
the optical line terminal calculates a switching time when the optical switching unit is to switch the optical communication paths between the optical line terminal and the plurality of optical network units, and sends to the optical switching unit a control frame including the calculated switching time when the optical switching unit is to make a switch from one of the optical communication paths between the optical line terminal and the plurality of optical network units to another, and an identifier of an optical communication path to which the switch is made in order to switch the optical communication paths between the optical line terminal and the plurality of optical network units; and
the optical switching unit switches the optical communication paths between the optical line terminal and the plurality of optical network units based on the switching time and the identifier of the optical communication path which are included in the control frame.

2. The optical access system according to claim 1, wherein the optical line terminal transmits a frame that is transferred from the another network to one of the plurality of optical network units when a predetermined time period elapses after transmission of the control frame.

3. The optical access system according to claim 2, wherein the predetermined time period is a sum of a time period that the optical switching unit requires to process the control frame and a time period that the optical switching unit requires to switch the optical communication paths.

4. The optical access system according to claim 1, wherein the control frame includes two or more pairs of the switching time for the optical communication paths and the identifier of the optical communication path.

5. The optical access system according to claim 4, wherein the optical line terminal is configured to:
transmit a first frame to be transferred to one of the plurality of optical network units when a predetermined first time period elapses after transmission of the control frame; and
transmit a second frame to be transferred to one of the plurality of optical network units when a predetermined second time period, which differs from the predetermined first time period, elapses after transmission of the first frame.

6. The optical access system according to claim 5, wherein the predetermined first time period is a sum of a time period that the optical switching unit requires to process the control frame and a time period that the optical switching unit requires to switch the optical communication paths.

7. The optical access system according to claim 5, wherein the predetermined second time period is a time period that the optical switching unit requires to switch the optical communication paths.

8. The optical access system according to claim 1, wherein the optical line terminal calculates a time when the optical switching unit is to switch the optical communication paths based on a time point at which the optical network unit concerned transmits a frame, an optical signal propagation delay time between the optical network unit concerned and the optical switching unit, and a time period that the optical switching unit requires to switch the optical communication paths.

9. An optical switching unit provided in an optical communication system that comprises an optical line terminal, which communicates with another network via a gateway, and a plurality of optical network units, which are each connected to a user terminal,
the optical switching unit being implemented between the optical line terminal and the plurality of optical network units to connect the optical line terminal and one of the plurality of optical network units by switching optical communication paths between the optical line terminal and the plurality of optical network units,
the optical switching unit switching the optical communication paths between the optical line terminal and the plurality of optical network units based on a switching time calculated by the optical line terminal and the identifier of the switched-to optical communication path which are contained in the control frame, when receiving from the optical line terminal a control frame which includes the switching time when a switch is to be made from one of the optical communication paths to another and an identifier of an optical communication path to which the switch is made.

10. The optical switching unit according to claim 9, wherein the control frame includes two or more pairs of the switching time for the communication paths and the identifier of the switched-to optical communication path.

11. An optical line terminal connected to another network which communicates with a plurality of optical network units over a plurality of optical communication paths set between the optical line terminal and the plurality of optical network units via an optical switching unit, the plurality of optical network units each being connected to a user terminal,
the optical line terminal being configured to:
calculate a switching time when the optical switching unit is to switch the optical communication paths between the optical line terminal and the plurality of optical network units,
generate, in order to enable the optical switching unit to switch from one of the plurality of optical communication paths to another, a control frame which includes the calculated switching time when a switch is to be made from one of the plurality of optical communication paths between the optical line terminal and the plurality of optical network units to another and an identifier of an optical communication path to which the switch is made; and
transmit the generated control frame to the optical switching unit.

12. The optical line terminal according to claim 11, wherein the generated control frame includes two or more pairs of the switching time when the optical switching unit is to make a switch from one of the plurality of optical communication paths to another and the identifier of the switched-to optical communication path.

13. The optical line terminal according to claim 11, wherein the switching time for the plurality of optical communication paths which is included in the control frame is calculated based on a frame length of a frame that is transferred from the another network to one of the plurality of optical network units.

14. The optical line terminal according to claim 11, wherein the identifier of the switched-to optical communication path included in the control frame is derived based on a destination of a frame that is transferred from the another network to one of the plurality of optical network units.

15. The optical line terminal according to claim 11, wherein:

the optical line terminal is further configured to transmit, when a given time period elapses after transmission of the control frame, a frame to be transferred to one of the plurality of optical network units; and the given time period is a sum of a time period that the optical switching unit requires to process the control frame and a time period that the optical switching unit requires to switch the plurality of optical communication paths.

16. The optical line terminal according to claim 11, wherein:

the optical line terminal is further configured to:

transmit a first frame to be transferred to one of the plurality of optical network units when a predetermined first time period elapses after transmission of the control frame; and transmit a second frame to be transferred to one of the plurality of optical network units when a predetermined second time period, which differs from the predetermined first time period, elapses after transmission of the first frame;

the predetermined first time period is a sum of a time period that the optical switching unit requires to process the control frame and a time period that the optical switching unit requires to switch the plurality of optical communication paths; and the predetermined second time period is a time period that the optical switching unit requires to switch the plurality of optical communication paths.

* * * * *